(12) United States Patent
Aoki et al.

(10) Patent No.: US 9,810,164 B2
(45) Date of Patent: Nov. 7, 2017

(54) PRIME MOVER CONTROL DEVICE FOR WORK VEHICLE

(71) Applicant: KCM Corporation, Hyogo (JP)

(72) Inventors: Isamu Aoki, Tsukuba (JP); Koji Hyodo, Kasumigaura (JP); Tetsuji Tanaka, Abiko (JP); Kentaro Oomae, Ushiku (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 14/914,372

(22) PCT Filed: Jan. 28, 2015

(86) PCT No.: PCT/JP2015/052302
§ 371 (c)(1),
(2) Date: Feb. 25, 2016

(87) PCT Pub. No.: WO2015/115456
PCT Pub. Date: Aug. 6, 2015

(65) Prior Publication Data
US 2016/0201582 A1    Jul. 14, 2016

(30) Foreign Application Priority Data
Jan. 30, 2014 (JP) .................................. 2014-015387

(51) Int. Cl.
*F02D 41/12* (2006.01)
*F02D 31/00* (2006.01)
(Continued)

(52) U.S. Cl.
CPC ........... *F02D 31/009* (2013.01); *F02D 29/02* (2013.01); *F02D 41/0205* (2013.01);
(Continued)

(58) Field of Classification Search
CPC .... F02D 31/009; F02D 41/0205; F02D 29/02; F02D 29/04; F02D 2200/023; F02D 2200/101
(Continued)

(56) References Cited

U.S. PATENT DOCUMENTS 4,485,444 A    11/1984   Maruyama et al.
6,030,314 A    2/2000    Brooks et al.
(Continued)

FOREIGN PATENT DOCUMENTS

DE    10 2007 025 926 A1    12/2008
EP     2 444 634 A1          4/2012
(Continued)

OTHER PUBLICATIONS

International Search Report (PCT/ISA/210) issued in PCT Application No. PCT/JP2015/052302 dated Apr. 14, 2015 with English translation (five pages).

(Continued)

*Primary Examiner* — Hai Huynh
(74) *Attorney, Agent, or Firm* — Crowell & Moring LLP

(57) ABSTRACT

A prime mover control device for a work vehicle, includes: a rotation speed control unit that controls a rotation speed of a prime mover in correspondence to an operation quantity of an accelerator operation member; a temperature detection unit that detects a temperature of cooling oil used to cool a brake; and a speed limiting unit that limits a maximum rotation speed of the prime mover by setting a lower limit for the maximum rotation speed when the temperature of the cooling oil detected by the temperature detection unit is higher than a predetermined temperature, compared to a limit set when the temperature of the cooling oil detected by the temperature detection unit is lower than the predetermined temperature, wherein: a maximum vehicle speed is (Continued)

limited by limiting the maximum rotation speed of the prime mover by the speed limiting unit.

6 Claims, 22 Drawing Sheets

(51) Int. Cl.
  *F02D 29/02* (2006.01)
  *F02D 41/02* (2006.01)
  *F02D 29/04* (2006.01)
(52) U.S. Cl.
  CPC ........ *F02D 29/04* (2013.01); *F02D 2200/023* (2013.01); *F02D 2200/101* (2013.01)
(58) Field of Classification Search
  USPC .......................... 123/399, 436; 701/103, 110
  See application file for complete search history.

(56) References Cited

U.S. PATENT DOCUMENTS

| | | | | |
|---|---|---|---|---|
| 6,299,263 B1* | 10/2001 | Uematsu | ................ | B60K 31/00 303/123 |
| 7,625,312 B2* | 12/2009 | Ido | ..................... | F16H 57/0413 477/110 |
| 2006/0069487 A1 | 3/2006 | Sychra et al. | | |
| 2006/0069488 A1 | 3/2006 | Sychra et al. | | |
| 2011/0308878 A1 | 12/2011 | Shirao | | |
| 2012/0094803 A1 | 4/2012 | Hyodo et al. | | |
| 2013/0041561 A1 | 2/2013 | Asami et al. | | |
| 2013/0191011 A1* | 7/2013 | Macfarlane | ............. | F02D 35/02 701/110 |

FOREIGN PATENT DOCUMENTS

| | | |
|---|---|---|
| JP | 57-95240 A | 6/1982 |
| JP | 2008-533956 A | 8/2008 |
| JP | 2010-229910 A | 10/2010 |
| JP | 2011-1845 A | 1/2011 |
| JP | 2011-236759 A | 11/2011 |
| JP | 2012-106565 A | 6/2012 |
| WO | WO 2010/116853 A1 | 10/2010 |

OTHER PUBLICATIONS

Japanese-language Written Opinion (PCT/ISA/237) issued in PCT Application No. PCT/JP2015/052302 dated Apr. 14, 2015 (four pages).
Extended European Search Report issued in counterpart European Application No. 15743607.2 dated Jul. 31, 2017 (eight pages).

* cited by examiner

FIG.17
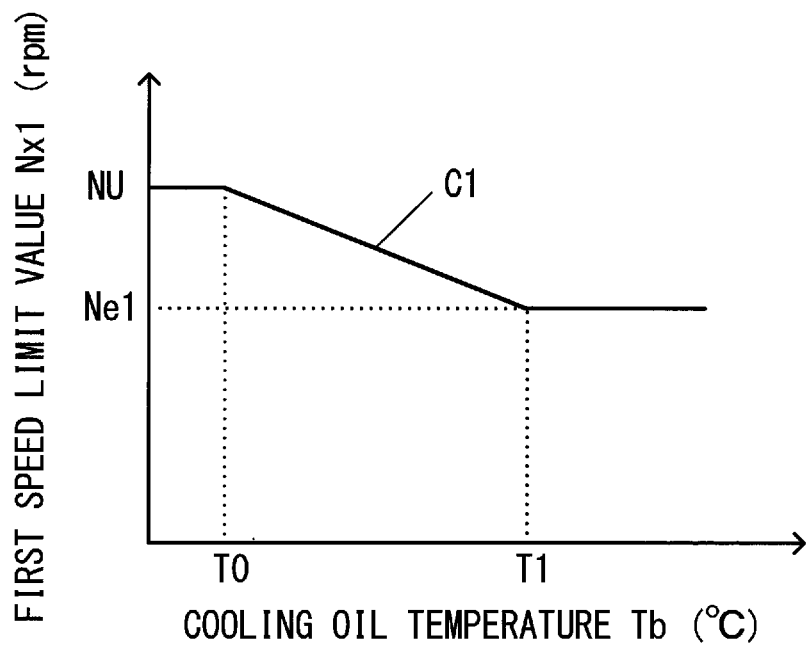
(a)
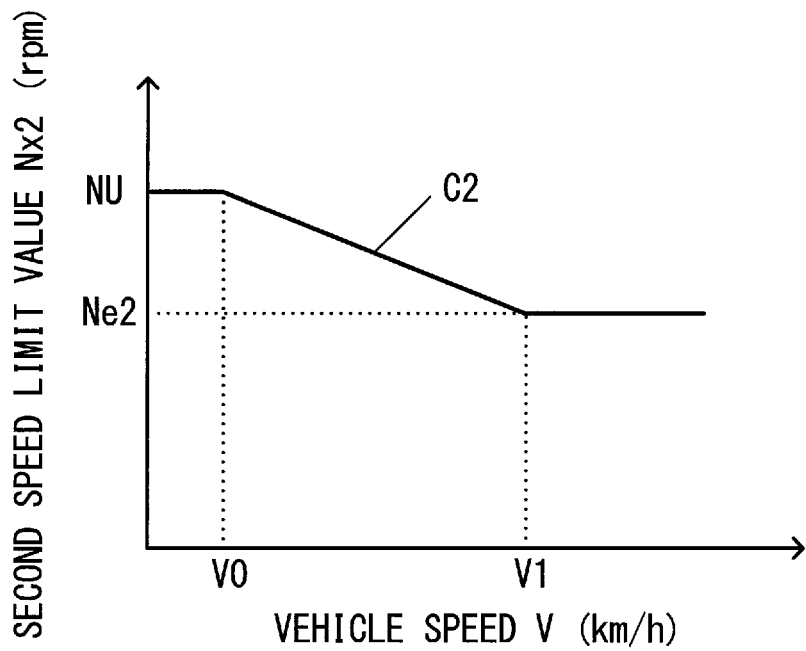
(b)

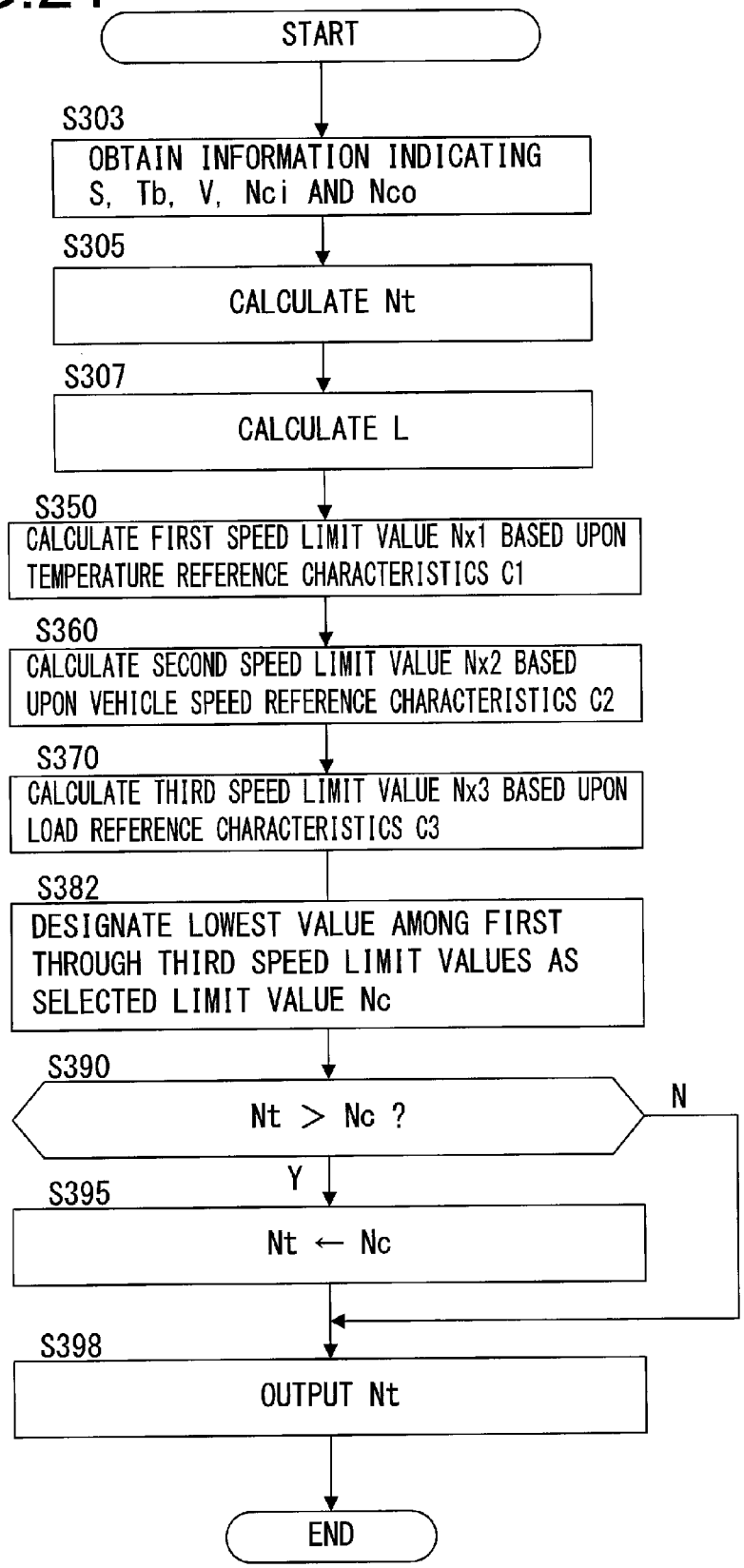

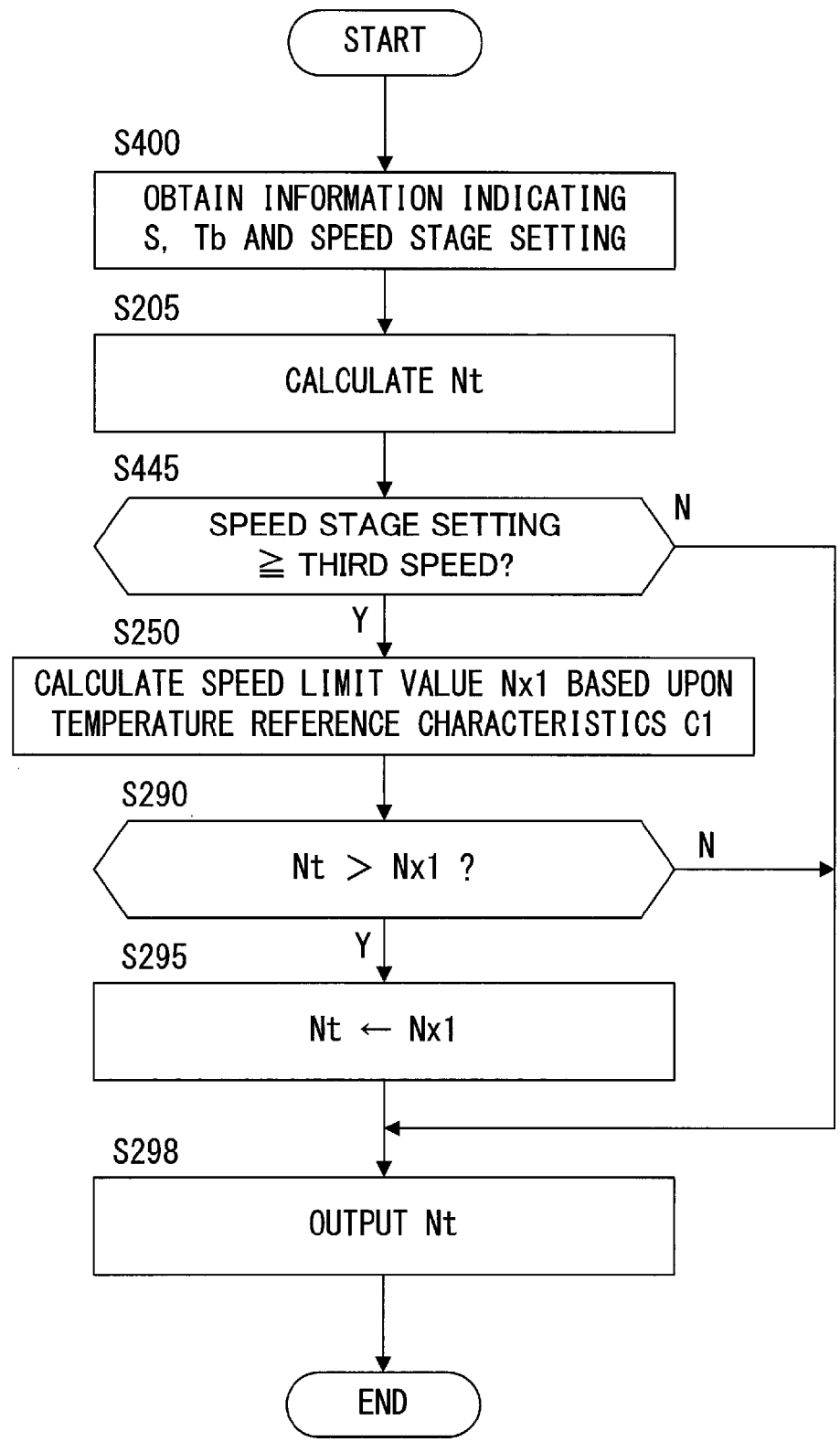

PRIME MOVER CONTROL DEVICE FOR WORK VEHICLE

TECHNICAL FIELD

The present invention relates to a prime mover control device for a work vehicle.

BACKGROUND ART

There is a work vehicle known in the related art having installed therein a drive force control device that executes control so as to lower the drive force transmitted from an engine to drive wheels when the temperature of the brake cooling oil reaches a level equal to or higher than a predetermined value (see PTL 1).

CITATION LIST

Patent Literature

PTL 1: Japanese Laid Open Patent Publication No. 2010-229910

SUMMARY OF INVENTION

Technical Problem

The vehicle can reach maximum speed under the control for reducing the drive force, and under such circumstances, an increase in the cooling oil temperature resulted from braking performed at high vehicle speed, e.g., at the maximum speed, is not effectively controlled.

In addition, PTL 1 describes that the drive force is reduced by imposing limits on pedal operation quantity and on target engine rotation speed in order to lower the maximum engine torque, without altering the engine performance curve. However, in order to lower the maximum engine torque without altering the engine performance curve, the engine rotation speed must be reduced to a level even lower than the engine rotation speed corresponding to the rated torque output point, and the traveling performance will be significantly compromised at such a markedly lowered engine rotation speed.

Solution to Problem

A prime mover control device for a work vehicle according to a first aspect of the present invention comprises: a rotation speed control unit that controls a rotation speed of a prime mover in correspondence to an operation quantity of an accelerator operation member; a temperature detection unit that detects a temperature of cooling oil used to cool a brake; and a speed limiting unit that limits a maximum rotation speed of the prime mover by setting a lower limit for the maximum rotation speed when the temperature of the cooling oil detected by the temperature detection unit is higher than a predetermined temperature, compared to a limit set when the temperature of the cooling oil detected by the temperature detection unit is lower than the predetermined temperature, wherein: a maximum vehicle speed is limited by limiting the maximum rotation speed of the prime mover by the speed limiting unit.

According to a second aspect of the present invention, in the prime mover control device for a work vehicle according to the first aspect, it is preferable that the speed limiting unit (200, 300) limits the maximum rotation speed of the prime mover so as not to exceed a limit that is set to a lower value when the temperature of the cooling oil detected by the temperature detection unit (163a, 163b) is higher.

According to a third aspect of the present invention, in the prime mover control device for a work vehicle according to the first or the second aspect, it is preferable to further comprise: a vehicle speed detection unit (16) that detects a vehicle speed, wherein: the speed limiting unit (100, 200) does not limit the maximum rotation speed of the prime mover even when the temperature of the cooling oil detected by the temperature detection unit (163a, 163b) is higher than the predetermined temperature if the vehicle speed detected by the vehicle speed detection unit (16) is lower than a predetermined vehicle speed.

According to a fourth aspect of the present invention, in the prime mover control device for a work vehicle according to any one of the first through the third aspects, it is preferable to further comprise: a load detection unit that detects a traveling load, wherein: the speed limiting unit does not limit the maximum rotation speed of the prime mover even when the temperature of the cooling oil detected by the temperature detection unit is higher than the predetermined temperature if the traveling load detected by the load detection unit is less than a predetermined load.

According to a fifth aspect of the present invention, in the prime mover control device for a work vehicle according to any one of the first through the fourth aspects, it is preferable to further comprise: a speed stage detection unit that detects a speed stage setting at a transmission, wherein: the speed limiting unit does not limit the maximum rotation speed of the prime mover even when the temperature of the cooling oil detected by the temperature detection unit is higher than the predetermined temperature if the speed stage setting detected by the speed stage detection unit (100) is lower than a predetermined speed stage.

According to a sixth aspect of the present invention, in the prime mover control device for a work vehicle according to the second aspect, it is preferable to further comprise: a vehicle speed detection unit that detects a vehicle speed, wherein: the speed limiting unit includes: a temperature reference limiting unit that limits the maximum rotation speed of the prime mover so as not to exceed a limit that is set to a lower value when the temperature of the cooling oil detected by the temperature detection unit is higher; and a vehicle speed reference limiting unit that limits the maximum rotation speed of the prime mover so as not to exceed a limit that is set to a lower value when the vehicle speed detected by the vehicle speed detection unit is higher; and the speed limiting unit limits the maximum rotation speed of the prime mover by either the temperature reference limiting unit or the vehicle speed reference limiting unit that sets a lower value for the limit on the maximum rotation speed of the prime mover.

According to a seventh aspect of the present invention, in the prime mover control device for a work vehicle according to the second aspect, it is preferable to further comprise: a load detection unit that detects a traveling load, wherein: the speed limiting unit includes: a temperature reference limiting unit that limits the maximum rotation speed of the prime mover so as not to exceed a limit that is set to a lower value when the temperature of the cooling oil detected by the temperature detection unit is higher; and a load reference limiting unit that limits the maximum rotation speed of the prime mover so as not to exceed a limit that is set to a lower value when the traveling load detected by the load detection unit is greater; and the speed limiting unit limits the maximum rotation speed of the prime mover by either the temperature reference limiting unit or the load reference limiting unit that sets a lower value for the limit on the maximum rotation speed of the prime mover.

According to an eighth aspect of the present invention, in the prime mover control device for a work vehicle according to the second aspect, it is preferable to further comprise: a vehicle speed detection unit that detects a vehicle speed; and a load detection unit that detects a traveling load, wherein: the speed limiting unit includes: a temperature reference limiting unit that limits the maximum rotation speed of the prime mover so as not to exceed a limit that is set to a lower value when the temperature of the cooling oil detected by the temperature detection unit is higher; a vehicle speed reference limiting unit that limits the maximum rotation speed of the prime mover so as not to exceed a limit that is set to a lower value when the vehicle speed detected by the vehicle speed detection unit is higher; and a load reference limiting unit that limits the maximum rotation speed of the prime mover so as not to exceed a limit that is set to a lower value when the traveling load detected by the load detection unit is greater; and the speed limiting unit limits the maximum rotation speed of the prime mover by the temperature reference limiting unit, the vehicle speed reference limiting unit or the load reference limiting unit that sets a lowest value for the limit on the maximum rotation speed of the prime mover.

Advantageous Effects of Invention

According to the present invention, the maximum vehicle speed can be limited by limiting the maximum rotation speed of the prime mover and, as a result, an increase in the temperature of the cooling oil used to cool the brakes can be effectively controlled.

DESCRIPTION OF EMBODIMENTS

The following is a description of embodiments of a prime mover control device for a work vehicle according to the present invention, given in reference to drawings.

—First Embodiment—

Figure 1:
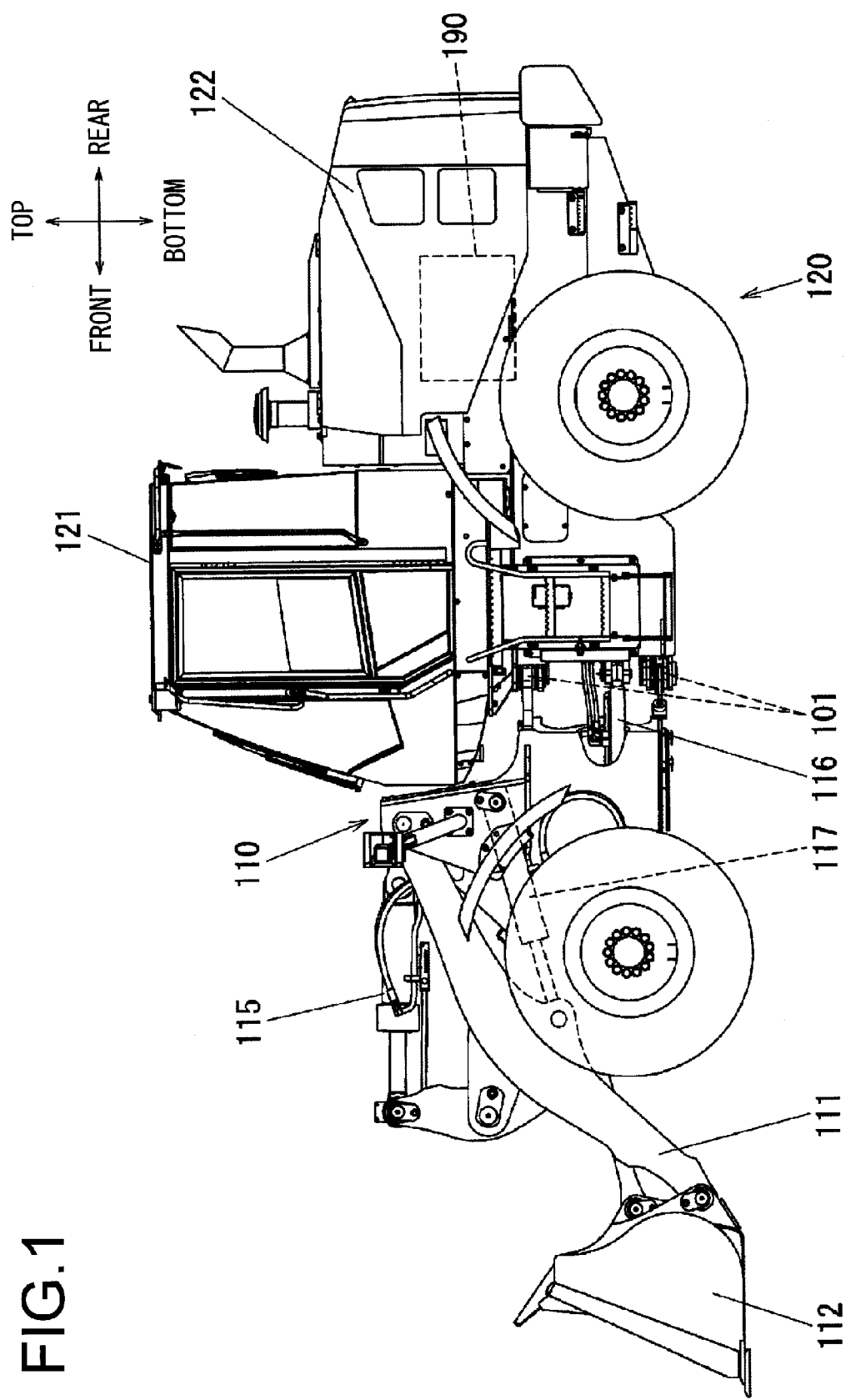
FIG. 1 A side elevation of a wheel loader representing an example of a work vehicle FIG. 2 A diagram schematically illustrating the structure of the wheel loader FIG. 3 A diagram illustrating the timing of automatic speed shift achieved via a transmission FIG. 4 A diagram indicating the relationship between an operation quantity representing the extent to which an accelerator pedal is operated and a target engine rotation speed FIG. 5 A flowchart of the operation of the limit control processing executed to limit the maximum engine rotation speed by a controller in the wheel loader in a first embodiment of the present invention FIG. 6 A flowchart of the operation of the limit control processing executed to limit the maximum engine rotation speed by the controller in the wheel loader in (variation 1) of the first embodiment of the present invention FIG. 7 A flowchart of the operation of the limit control processing executed to limit the maximum engine rotation speed by the controller in the wheel loader in (variation 2) of the first embodiment of the present invention FIG. 8 A flowchart of the operation of the limit control processing executed to limit the maximum engine rotation speed by the controller in the wheel loader in (variation 3) of the first embodiment of the present invention FIG. 9 A functional block diagram pertaining to the controller in the wheel loader achieved in a second embodiment of the present invention FIG. 10 A diagram indicating the relationship between the cooling oil temperature and a speed limit value FIG. 11 A flowchart of the operation of the limit control processing executed to limit the maximum engine rotation speed by the controller in the wheel loader in the second embodiment of the present invention FIG. 12 A functional block diagram pertaining to the controller in the wheel loader achieved in (variation 1) of the second embodiment of the present invention FIG. 13 A flowchart of the operation of the limit control processing executed to limit the maximum engine rotation speed by the controller in the wheel loader in (variation 1) of the second embodiment of the present invention FIG. 14 A flowchart of the operation of the limit control processing executed to limit the maximum engine rotation speed by the controller in the wheel loader in (variation 2) of the second embodiment of the present invention FIG. 15 A flowchart of the operation of the limit control processing executed to limit the maximum engine rotation speed by the controller in the wheel loader in (variation 3) of the second embodiment of the present invention FIG. 16 A functional block diagram pertaining to the controller in the wheel loader achieved in a third embodiment of the present invention FIG. 17 A diagram indicating the relationship between the cooling oil temperature and a first speed limit value presented in (a) and a diagram indicating the relationship between the vehicle speed and a second speed limit value presented in (b)

FIG. 1 is a side elevation of a wheel loader representing an example of a work vehicle having installed therein the prime mover control device achieved in the first embodiment of the present invention. A wheel loader comprises a front body 110 that includes an arm 111, a bucket 112, front wheels and the like and a rear body 120 that includes an operator's cab 121, a machine room 122, rear wheels and the like. An engine 190 is installed inside the machine room 122.

As the arm 111 is driven via an arm cylinder 117, it rotates up/down (moves upward or downward), whereas as the bucket 112 is driven via a bucket cylinder 115, it rotates up/down (the bucket 112 is engaged in a crowding operation or a dumping operation). The front body 110 and the rear body 120 are connected with each other via a center pin 101 so as to articulate freely relative to each other. As a steering cylinder 116 extends/contracts, the front body 110 pivots to the left or to the right relative to the rear body 120.

Figure 2:
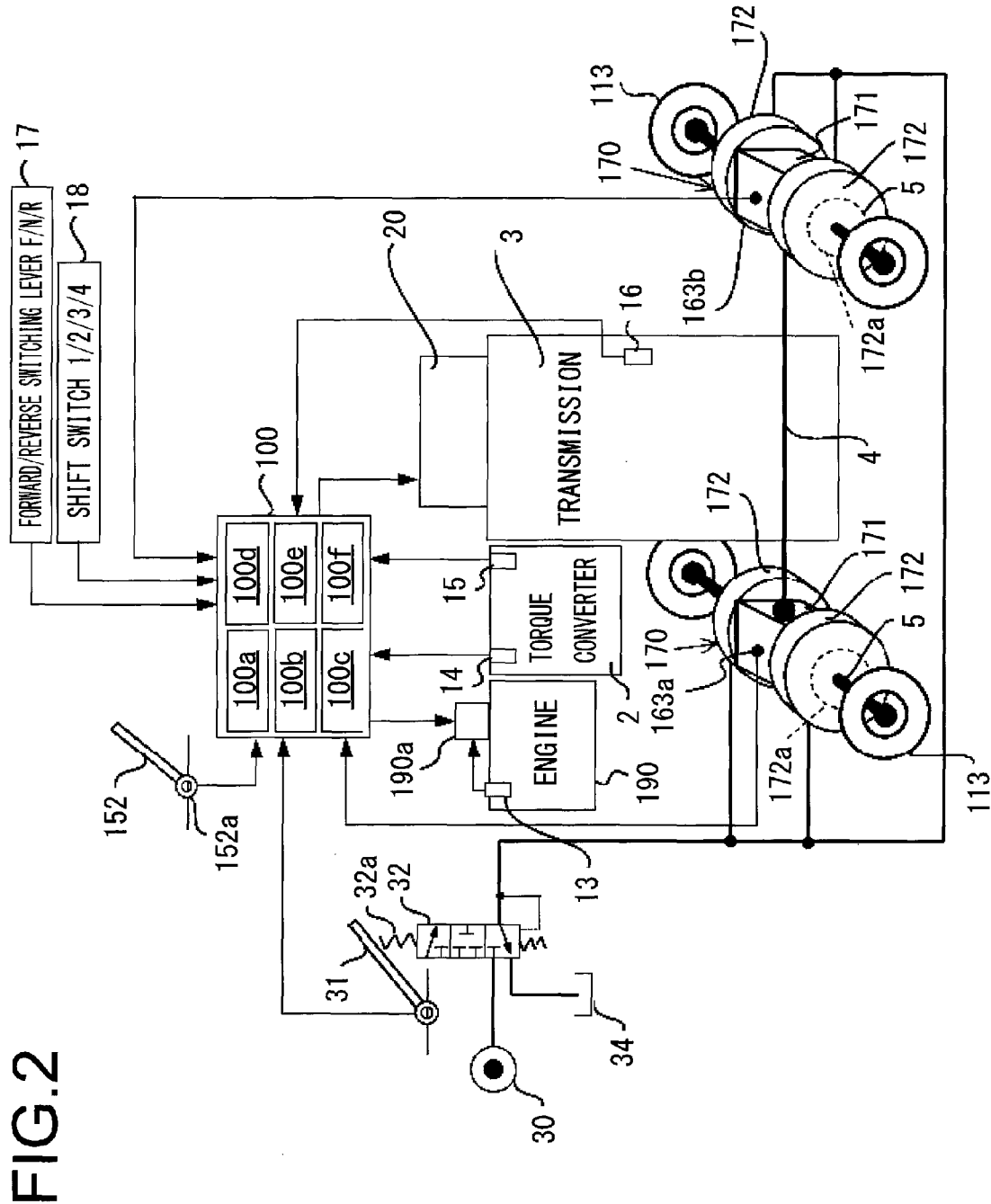

FIG. 2 presents a diagram schematically illustrating the structure of the wheel loader. The wheel loader is equipped with a traveling drive device (traveling system) that transmits rotation of the engine 190 to tires 113 via a torque converter (hereafter notated as TC) 2, a transmission 3, a drive shaft 4 and axles 5. An input shaft 21 of the TC 2 is linked to an output shaft of the engine 190, whereas an output shaft of the TC 2 is linked to the transmission 3. The rotation of the engine 190 is transmitted to the transmission 3 via the TC 2, which is a fluid clutch configured with an impeller, a turbine and a stator of the known art. The transmission 3 includes clutches by which the speed stage is switched to one of the first through fourth speeds and the speed of the rotation of the output shaft at the TC 2 is altered via the transmission 3. The rotation, having undergone the speed change, is transmitted to the tires 113 via the drive shaft 4, differential devices (differential gear units) 170 and the axles 5, thereby enabling the wheel loader to travel.

The drive force imparted via the drive shaft 4 is transmitted to the axles 5 via the differential devices 170 of the known art. The differential devices 170 each include a gear group via which the drive force from the drive shaft 4 is transmitted to the corresponding axle 5 and wet multiple-disk brakes mounted at the axles 5. The gear groups are housed in differential housing bodies 171, whereas the disk brakes are each housed in a brake case 172. The differential housing bodies 171 and the brake cases 172 are connected to each other, thereby forming integrated case units, and cooling oil used to cool the gear group and the disk brakes is stored in this integrated case units.

As hydraulic oil is supplied via a brake valve 32 to the disk brakes, the disk brakes generate a braking force corresponding to the pressure of the hydraulic oil. The brake valve 32 is a pressure-reducing valve via which the pressure of pressure oil (pressurized oil) provided from a hydraulic source 30, at which the hydraulic oil originates, is reduced to a level corresponding to the compressive force imparted from a spring 32a. As the operator steps on a brake pedal 31 located inside the operator's cab 121 and the spring 32a is compressed in correspondence to the stepping force applied to the brake pedal 31, the pressure of the pressure oil provided from the hydraulic source 30, is reduced via the brake valve 32 so as to achieve a pressure corresponding to the stepping force applied to the brake pedal 31. The brake valve 32 lowers the pressure of the hydraulic oil so that hydraulic oil achieving a higher pressure is provided to the disk brakes as the compressive force at the spring 32a becomes higher, i.e., as a greater stepping force is applied to the brake pedal 31. Reference numeral 34 indicates a hydraulic oil tank.

The TC 2 has a function of increasing the output torque relative to the input torque, i.e., a function of achieving a torque ratio equal to or greater than 1. The torque ratio decreases as a TC speed ratio e (=output rotation speed Nco/input rotation speed Nci), which is the ratio of a rotation speed Nco at the output shaft of the TC 2 to a rotation speed Nci at the input shaft of the TC 2, increases. For instance, as the traveling load increases while the work vehicle is traveling at a constant engine rotation speed, the rotation speed Nco at the output shaft of the TC 2 decreases, i.e., the vehicle speed decreases, to result in a decrease in the TC speed ratio e. In this situation, the torque ratio increases and thus, the vehicle is able to travel with a greater traveling drive force (with a greater tractive force).

The transmission 3 is an automatic transmission that includes solenoid valves each corresponding to one of the speed stages, i.e., first through fourth speeds. These solenoid valves are driven by control signals output from a controller 100 to a transmission control unit 20, as will be explained later. The transmission 3 thus shifts speeds in response to the control signals.

The controller 100 is configured so as to include an arithmetic processing device comprising a CPU, storage devices such as a ROM and a RAM, other peripheral circuits and the like. A rotation speed detector 14 that detects the rotation speed Nci at the input shaft of the TC 2, a rotation speed detector 15 that detects the rotation speed Nco at the output shaft of the TC 2 and a vehicle speed sensor 16 that detects the traveling speed of the vehicle (hereafter referred to as the vehicle speed) are connected to the controller 100.

The controller 100 has functions achieved in the form of a speed ratio calculation unit 100a and a traveling load calculation unit 100b. Based upon the rotation speed Nci at the input shaft of the TC 2 detected by the rotation speed detector 14 and the rotation speed Nco at the output shaft of the TC 2 detected by the rotation speed detector 15, the speed ratio calculation unit 100a calculates the TC speed ratio e (=output rotation speed Nco/input rotation speed Nci).

Based upon the rotation speed Nci at the input shaft of the TC 2 detected by the rotation speed detector 14 and the rotation speed Nco at the output shaft of the TC 2 detected by the rotation speed detector 15, the traveling load calculation unit 100b calculates a traveling load L (=input rotation speed Nci/output rotation speed Nco).

A forward/reverse switching lever 17, via which a forward or reverse command for the vehicle is issued, is connected to the controller 100, and the operation position of the forward/reverse switching lever 17 (forward (F)/neutral (N)/reverse (R)) is detected by the controller 100. As the forward/reverse switching lever 17 is switched to the forward (F) position, the controller 100 outputs a control signal to the transmission control unit 20 so as to set a forward clutch (not shown) in the transmission 3 in an engaged state. As the forward/reverse switching lever 17 is switched to the reverse (R) position, the controller 100 outputs a control signal to the transmission control unit 20 so as to set a reverse clutch (not shown) in the transmission 3 in an engaged state.

Upon receiving the control signal for setting the forward clutch or the reverse clutch (not shown) in an engaged state, a clutch control valve (not shown) installed in the transmission control unit 20 is activated so as to set the forward or reverse clutch in an engaged state, thereby switching the advancing direction of the work vehicle to forward or reverse.

As the forward/reverse switching lever 17 is switched to the neutral (N) position, the controller 100 outputs a control signal to the transmission control unit 20 so as to set the forward and reverse clutches (not shown) in a released state. As a result, the forward and reverse clutches (not shown) enter a released state and the transmission 3 assumes a neutral state.

A shift switch 18, via which a command specifying a speed stage upper limit among the first through fourth speeds is issued, is connected to the controller 100, and automatic speed shift takes place at the transmission 3 by designating the speed stage selected via the shift switch 18 as the upper limit. For instance, if the second speed is selected via the shift switch 18, the speed stage is set to the first speed or the second speed, whereas if the first speed is selected, the speed stage is fixed at the first speed.

Figure 3:
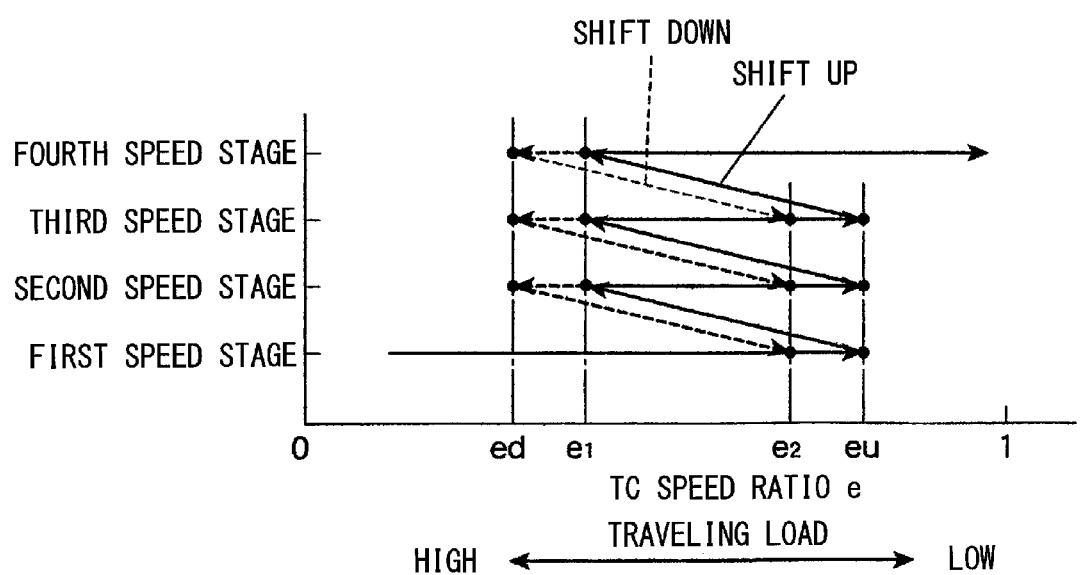

FIG. 3 is a diagram indicating the timing with which automatic speed shift takes place at the transmission 3, represented as the relationship between the TC speed ratio e and the speed stage. Automatic speed shift control may be executed by adopting either of the following two methods; TC speed ratio reference control under which a speed shift occurs as the TC speed ratio e reaches a predetermined value and vehicle speed reference control under which a speed shift occurs as the vehicle speed reaches a predetermined value. In this embodiment, the speed stage at the transmission 3 is regulated under the TC speed ratio reference control.

As the traveling load decreases and the TC speed ratio e increases until it becomes equal to or greater than a predetermined value eu, the speed stage is shifted up by one stage. As a result, the TC speed ratio e becomes equal to e1 (ed<e1<eu). In contrast, as the traveling load increases and the TC speed ratio e decreases until it is equal to or less than a predetermined value ed, the speed stage is shifted down by one stage. In this case, the TC speed ratio e becomes equal to e2 (ed<e2<eu). The predetermined values eu and ed are set in advance in the controller 100. The controller 100 detects the speed stage that is currently set at the transmission 3 (hereafter referred to as the speed stage setting).

As shown in FIG. 2, an accelerator operation quantity detector 152a that detects a pedal operation quantity (pedal operation amount, i.e., a pedal stroke or a pedal angle) at an accelerator pedal 152 is connected to the controller 100.

Figure 4:
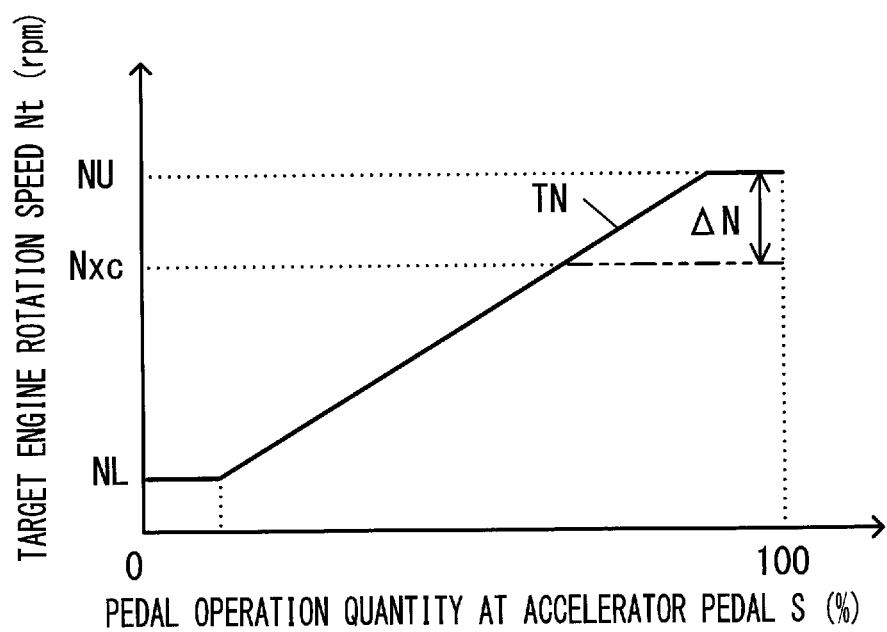

The controller 100 has a function achieved in the form of a target speed setting unit 100c. The target speed setting unit 100c sets a target engine rotation speed (command speed) Nt for the engine 190 in correspondence to the pedal operation quantity (the extent to which the accelerator pedal is stepped on) at the accelerator pedal 152, detected by the accelerator operation quantity detector 152a. FIG. 4 is a diagram indicating the relationship between the operation quantity S at the accelerator pedal 152 and the target engine rotation speed Nt. In the figure, the solid line represents an example of characteristics that may manifest when no limit is imposed on the engine rotation speed, whereas the two-point chain line represents an example of characteristics that may manifest when a limit is imposed on the engine rotation speed.

In a storage device at the controller 100, a table of characteristics TN with respect to the relation of the target engine rotation speed to the operation quantity S at the accelerator pedal 152 shown in FIG. 4, is stored. The target speed setting unit 100c sets the target engine rotation speed Nt based upon the operation quantity S detected by the accelerator operation quantity detector 152a by referencing the table of the characteristics TN. When the accelerator pedal 152 is not being operated (0%), the target engine rotation speed Nt is set to a low idle rotation speed NL. As the pedal operation quantity S at the accelerator pedal 152 increases, the target engine rotation speed Nt increases. When the pedal is operated to the maximum extent (100%), the target engine rotation speed Nt is set to an upper limit NU. In other words, the target engine rotation speed Nt can be adjusted over a range between the upper limit value NU and the low idle rotation speed NL through operation of the accelerator pedal 152.

As shown in FIG. 2, the controller 100 outputs a control signal that corresponds to the target engine rotation speed Nt having been set, to an engine controller 190a. A rotation speed sensor 13 that detects the actual engine rotation speed at the engine 190 is connected to the engine controller 190a. The engine controller 190a compares the actual engine rotation speed at the engine 190 detected by the rotation speed sensor 13 with the target engine rotation speed Nt provided by the controller 100, and controls a fuel injection system (not shown) so as to adjust the actual engine rotation speed at the engine 190 toward the target engine rotation speed Nt.

A limit value Nxc is stored in a storage device at the controller 100. The limit value Nxc is a value lower than the upper limit value NU by a limiting extent ΔN and is higher than the low idle rotation speed NL. It is desirable that the limit value Nxc be set to a value higher than the engine rotation speed corresponding to the rated torque output point (maximum torque point). In the embodiment, when predetermined conditions, which will be explained later, are achieved, a limit is imposed on the target engine rotation speed Nt so as not to exceed the limit value Nxc even if the pedal is operated to the maximum extent. When the target engine rotation speed is limited, the maximum rotation speed at the engine 190, too, is limited, and consequently, the maximum vehicle speed is also limited.

The controller 100 has functions achieved in the form of a mode determination unit 100d, a mode setting unit 100e and a correction unit 100f. The mode determination unit 100d makes a decision as to whether a control mode for the engine rotation speed, to be explained later, is currently set to a "limit mode" or to a "non-limit mode".

Oil temperature sensors 163a and 163b, each capable of detecting the temperature of the cooling oil (hereafter may be referred to as cooling oil temperature) inside the corresponding brake case 172 and outputting a cooling oil temperature signal to the controller 100, are connected to the controller 100.

When the selected mode is the "non-limit mode", the mode setting unit 100e makes a decision as to whether or not the cooling oil temperature Tb is equal to or higher than a threshold value Tb1. In the "non-limit mode", if the cooling oil temperature Tb is determined to be equal to or higher than the threshold value Tb1, the mode setting unit 100e decides that limit conditions exist and accordingly sets the control mode for the engine rotation speed to the "limit mode". The threshold value Tb1 is stored in advance in a storage device at the controller 100. It is to be noted that while the cooling oil temperature Tb is calculated by averaging a temperature Tbf of the cooling oil inside the front wheel-side brake case 172 and a temperature Tbr of the cooling oil inside the rear wheel-side brake case 172 in the embodiment, the temperature Tbf of the front wheel-side cooling oil or the temperature Tbr of the rear wheel-side cooling oil that is higher than the other, may be designated as the cooling oil temperature Tb, or either the cooling oil temperature on the front wheel side or the rear wheel side may be simply designated as Tb.

When the selected mode is the "limit mode", the mode setting unit 100e makes a decision as to whether or not the cooling oil temperature Tb is equal to or lower than a threshold value Tb0. In the "limit mode", if the cooling oil temperature Tb is determined to be equal to or lower than the threshold value Tb0, the mode setting unit 100e decides that limit-clear conditions exist and accordingly sets the control mode for the engine rotation speed to the "non-limit mode". The threshold value Tb0, which is lower than the threshold value Tb1 (Tb0<Tb1), is stored in advance in a storage device at the controller 100.

When the control mode for the engine rotation speed is set in the "limit mode", the correction unit 100f compares the target engine rotation speed Nt with the limit value Nxc, and if the target engine rotation speed Nt is higher than the limit value Nxc, it resets, i.e., corrects, the target engine rotation speed Nt to the limit value Nxc. If the target engine rotation speed Nt is equal to or lower than the limit value Nxc, the correction unit 100f does not make any correction. In addition, if the control mode for the engine rotation speed is currently set in the "non-limit mode", the correction unit 100f does not make any correction. Namely, in the "non-limit mode", the actual engine rotation speed is controlled in reference to the target engine rotation speed Nt (within the range between the low idle value and the upper limit value NU) corresponding to the pedal operation quantity S.

Figure 5:
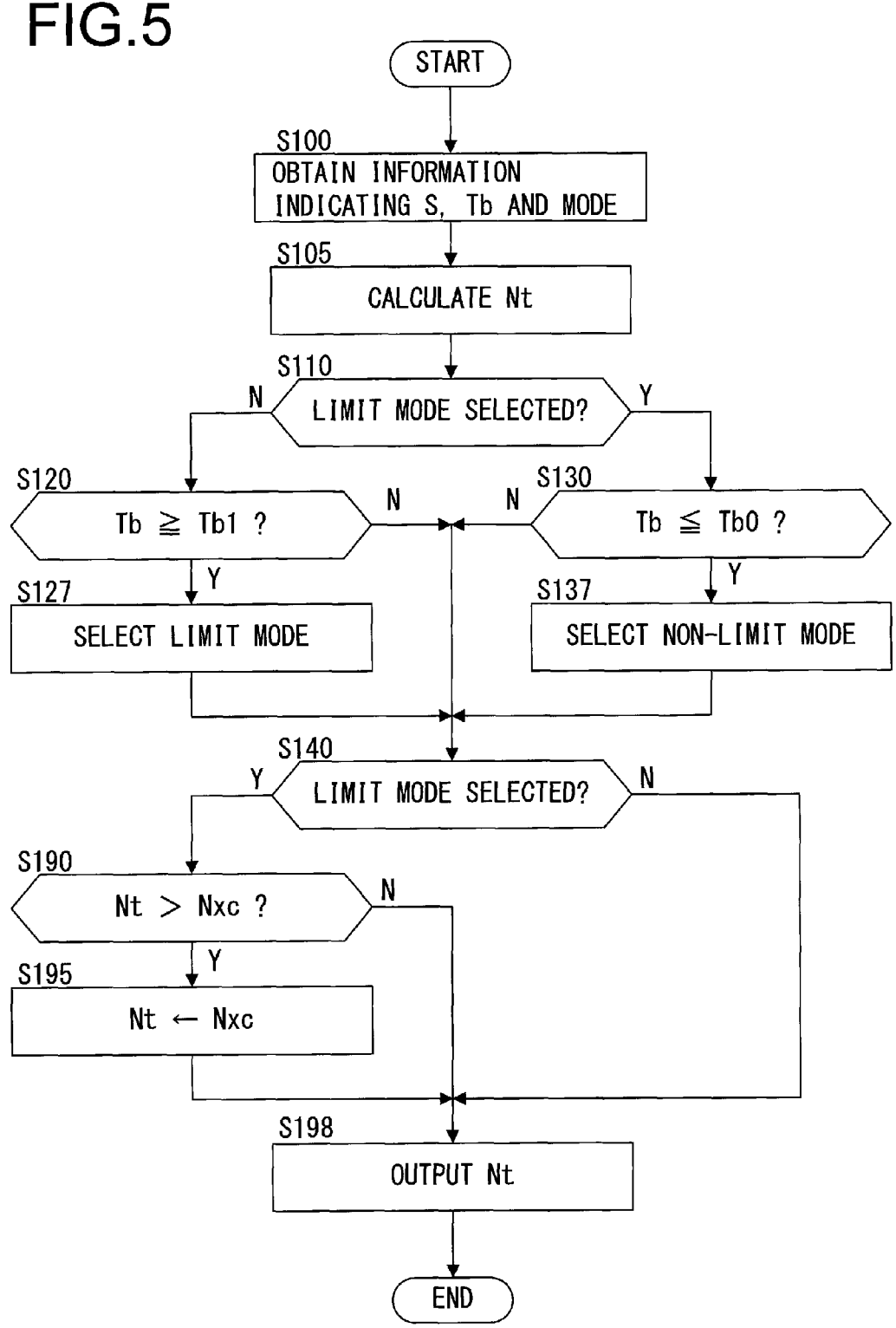

The limit control executed for the maximum engine rotation speed will be described next in reference to the flowchart presented in FIG. 5. FIG. 5 is a flowchart of the operation of the limit control processing executed to limit the maximum engine rotation speed by the controller 100 in the wheel loader achieved in the first embodiment of the present invention. After an ignition switch (not shown) is turned on, initial settings are established (not shown), and then a program enabling the processing shown in FIG. 5 is started up and is repeatedly executed by the controller 100. It is to be noted that the non-limit mode, in which no limit is imposed on the maximum rotation speed of the engine 190, is selected as the initial mode setting.

In step S100, the controller 100 reads information indicating the pedal operation quantity S at the accelerator pedal 152 detected by the accelerator operation quantity detector 152a. In step S100, the controller 100 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Furthermore, the controller 100 reads mode information (limit mode/non-limit mode) in step S100. Upon completing the read of the various types of information in step S100, the operation proceeds to step S105.

In step S105, the controller 100 calculates the target engine rotation speed Nt based upon the pedal operation quantity S by referencing the table of the characteristics TN of the target engine rotation speed shown in FIG. 4, and then the operation proceeds to step S110.

In step S110, the controller 100 makes a decision as to whether or not the currently selected mode is the limit mode. If a negative decision is made in step S110, i.e., if it is decided in step S110 that the non-limit mode is currently selected, the operation proceeds to step S120, whereas if an affirmative decision is made in step S110, i.e., if it is decided that the limit mode is currently selected, the operation proceeds to step S130.

In step S120, the controller 100 makes a decision as to whether or not the cooling oil temperature Tb is equal to or higher than the threshold value Tb1. Upon making an affirmative decision in step S120, i.e., upon deciding that the limit conditions exist, the operation proceeds to step S127. If, on the other hand, a negative decision is made in step S120, i.e., if it is decided that the limit conditions do not exist, the operation proceeds to step S140.

In step S127, the controller 100 selects the limit mode and then the operation proceeds to step S140.

In step S130, the controller 100 makes a decision as to whether or not the cooling oil temperature Tb is equal to or lower than the threshold value Tb0. Upon making an affirmative decision in step S130, i.e., upon deciding that the limit clear conditions exist, the operation proceeds to step S137. If, on the other hand, a negative decision is made in step S130, i.e., if it is decided that the limit clear conditions do not exist, the operation proceeds to step S140.

In step S137, the controller 100 selects the non-limit mode and then the operation proceeds to step S140.

In step S140, the controller 100 makes a decision as to whether or not the currently selected mode is the limit mode. If an affirmative decision is made in step S140, i.e., if it is decided in step S140 that the limit mode is currently selected, the operation proceeds to step S190, whereas if a negative decision is made in step S140, i.e., if it is decided that the non-limit mode is currently selected, the operation proceeds to step S198.

In step S190, the controller 100 makes a decision as to whether or not the target engine rotation speed Nt, having been calculated in step S105, is higher than the limit value Nxc stored in the storage device. If an affirmative decision is made in step S190, the operation proceeds to step S195, whereas if a negative decision is made in step S190, the operation proceeds to step S198.

In step S195, the controller 100 sets the limit value Nxc as the target engine rotation speed Nt, before the operation proceeds to step S198.

In step S198, the controller 100 outputs a control signal corresponding to the target engine rotation speed Nt to the engine controller 190a. The engine controller 190a controls the fuel injection system (not shown) so as to adjust the actual engine rotation speed at the engine 190 toward the target engine rotation speed Nt provided by the controller 100.

The operation executed in the first embodiment may be summarized as follows. When the cooling oil temperature Tb is lower than the threshold value Tb1, no restriction is imposed on the maximum rotation speed of the engine 190. When the accelerator pedal 152 is pressed down to the maximum extent, the target engine rotation speed Nt is set to the upper limit value NU and the actual engine rotation speed is controlled to the upper limit value NU (No in step S140→step S198).

As the brakes are applied repeatedly and the cooling oil temperature Tb rises to a level equal to or higher than the threshold value Tb1 due to the resultant frictional heat, a limit is imposed on the maximum rotation speed of the engine 190. The target engine rotation speed Nt corresponding to the maximum operation quantity at the accelerator pedal 152 is set to the limit value Nxc and thus, the actual engine rotation speed is controlled to the limit value Nxc (Yes in step S140→Yes in step S190→step S195→step S198). As the maximum rotation speed of the engine 190 is thus limited, the maximum vehicle speed is also limited and consequently, an increase in the cooling oil temperature is inhibited.

The following advantages and operations are achieved through the first embodiment described above.

(1) A limit is imposed on the maximum rotation speed of the engine 190 when the cooling oil temperature Tb is equal to or higher than the threshold value Tb1 so as to hold it lower than the maximum rotation speed set when the cooling oil temperature Tb is lower than the threshold value Tb1. By limiting the maximum rotation speed of the engine 190, the maximum vehicle speed can also be limited or lowered, which, in turn, makes it possible to prevent a braking operation at the maximum vehicle speed. In addition, by limiting or lowering the maximum vehicle speed, the braking operation frequency can be reduced. All these factors ultimately make it possible to effectively suppress an increase in the temperature Tb of the cooling oil used to cool the brakes. As a result, damage to components coming into contact with the cooling oil, such as the seals in the cases housing the brakes, can be prevented.

—(Variation 1) of First Embodiment—

In reference to FIG. 2 and FIG. 6, the prime mover control device achieved in (variation 1) of the first embodiment will be described. The work vehicle in (variation 1) of the first embodiment assumes a structure similar to that of the work vehicle achieved in the first embodiment (see FIG. 2). The following explanation will focus on features different from those of the first embodiment.

In the first embodiment, the maximum rotation speed of the engine 190 is limited when the cooling oil temperature Tb is equal to or higher than the threshold value Tb1.

In contrast, the maximum rotation speed of the engine 190 is not limited in (variation 1) of the first embodiment even when the cooling oil temperature Tb is equal to or higher than the threshold value Tb1, as long as the vehicle speed V detected by the vehicle speed sensor 16 shown in FIG. 2 is lower than a threshold value V1.

When the mode setting is the "non-limit mode", the mode setting unit 100e makes a decision as to whether or not the cooling oil temperature Tb is equal to or higher than the threshold value Tb1 and whether or not the vehicle speed V is equal to or higher than the threshold value V1. If it is decided in the "non-limit mode" that the cooling oil temperature Tb is equal to or higher than the threshold value Tb1 and the vehicle speed V is equal to or higher than the threshold value V1, the mode setting unit 100e decides that limit conditions exist and sets the control mode for the engine rotation speed to the "limit mode". The threshold value V1 is stored in advance in a storage device at the controller 100.

Figure 6:
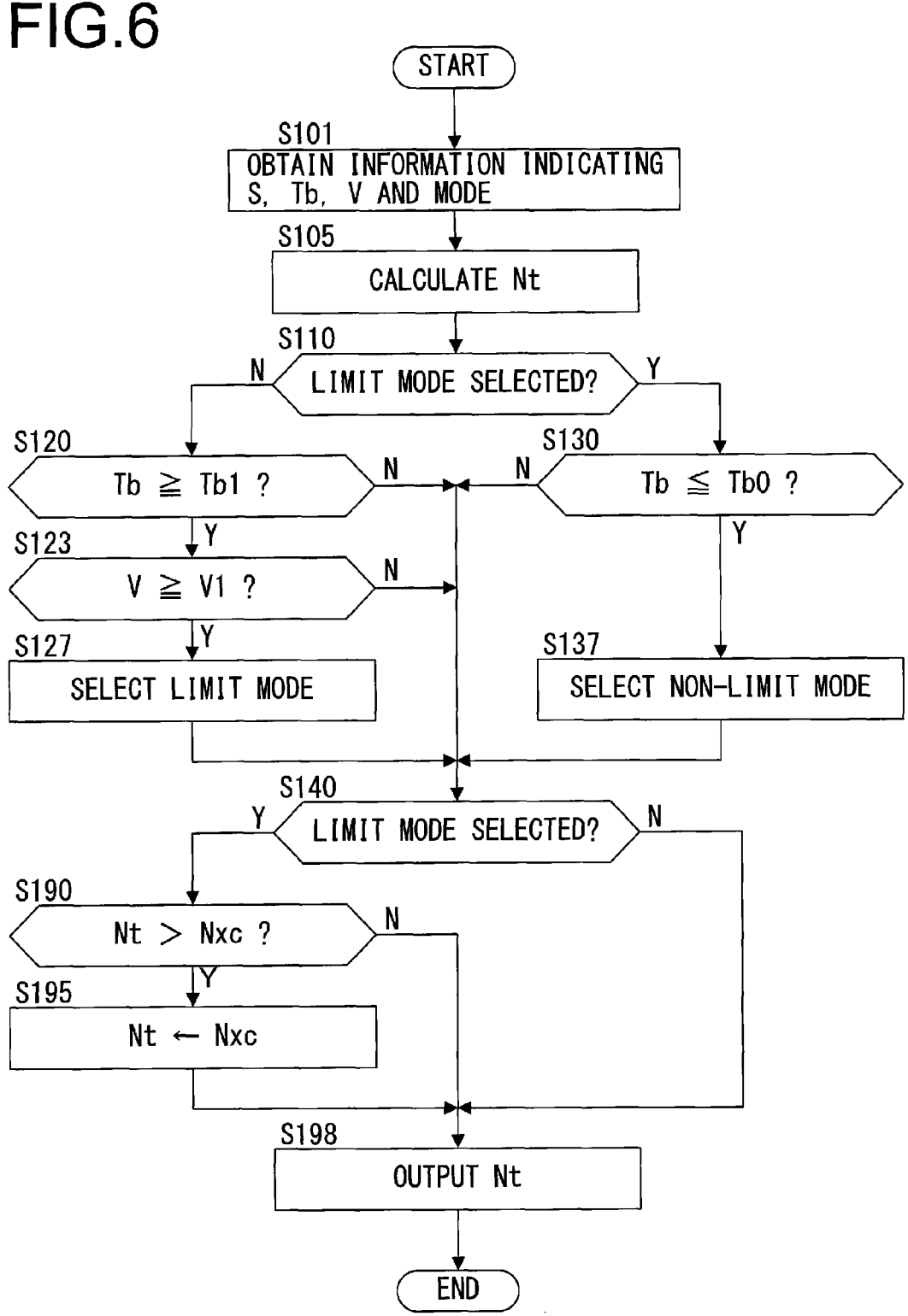

FIG. 6 is a flowchart of the operation of the limit control processing executed to limit the maximum engine rotation speed by the controller in the wheel loader achieved in (variation 1) of the first embodiment of the present invention. The flowchart presented in FIG. 6 includes the processing executed in step S101, replacing the processing in step S100 in the flowchart presented in FIG. 5, and also includes the processing executed in step S123 added between step S120 and step S127.

As shown in FIG. 6, in step S101, the controller 100 reads information indicating the pedal operation quantity S at the accelerator pedal 152 detected by the accelerator operation quantity detector 152a and information indicating the vehicle speed V detected by the vehicle speed sensor 16. In step S101, the controller 100 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Furthermore, the controller 100 reads mode information (limit mode/non-limit mode) in step S101. Upon completing the read of the various types of information in step S101, the operation proceeds to step S105.

Upon making an affirmative decision in step S120, the operation proceeds to step S123, in which the controller 100 makes a decision as to whether or not the vehicle speed V is equal to or higher than the threshold value V1. If an affirmative decision is made in step S123, i.e., if it is decided that the limit conditions exist, the operation proceeds to step S127, whereas if a negative decision is made in step S123, i.e., if it is decided that the limit conditions do not exist, the operation proceeds to step S140.

In addition to advantages and operations similar to those achieved in the first embodiment, advantages and operations described in (2) below are achieved through (variation 1) of the first embodiment described above.

(2) Since less heat is generated as the brakes are engaged while the vehicle is traveling at low speed, i.e., when the vehicle speed V is lower than the threshold value V1, compared to the amount of heat generated from braking when the vehicle is traveling at high speed with the vehicle speed V matching or exceeding the threshold value V1, the brake cooling oil temperature does not rise readily in the low-speed traveling state. In this variation, the maximum rotation speed of the engine 190 is not limited even if the cooling oil temperature Tb is equal to or higher than the threshold value Tb1, as long as the vehicle speed V is lower than the threshold value V1, making it possible to achieve better work efficiency over the first embodiment.

—(Variation 2) of First Embodiment—

In reference to FIG. 2 and FIG. 7, the prime mover control device achieved in (variation 2) of the first embodiment will be described. The work vehicle in (variation 2) of the first embodiment assumes a structure similar to that of the work vehicle achieved in the first embodiment (see FIG. 2). The following explanation will focus on features different from those of the first embodiment.

In the first embodiment, the maximum rotation speed of the engine 190 is limited when the cooling oil temperature Tb is equal to or higher than the threshold value Tb1.

In contrast, the maximum rotation speed of the engine 190 is not limited in (variation 2) of the first embodiment even when the cooling oil temperature Tb is equal to or higher than the threshold value Tb1, as long as the traveling load L calculated by the traveling load calculation unit 100b shown in FIG. 2 is less than a threshold value L1.

When the mode setting is the "non-limit mode", the mode setting unit 100e makes a decision as to whether or not the cooling oil temperature Tb is equal to or higher than the threshold value Tb1 and whether or not the traveling load L is equal to or greater than the threshold value L1. If it is decided in the "non-limit mode" that the cooling oil temperature Tb is equal to or higher than the threshold value Tb1 and the traveling load L is equal to or greater than the threshold value L1, the mode setting unit 100e decides that limit conditions exist and sets the control mode for the engine rotation speed to the "limit mode". The threshold value L1 is stored in advance in a storage device at the controller 100.

Figure 7:
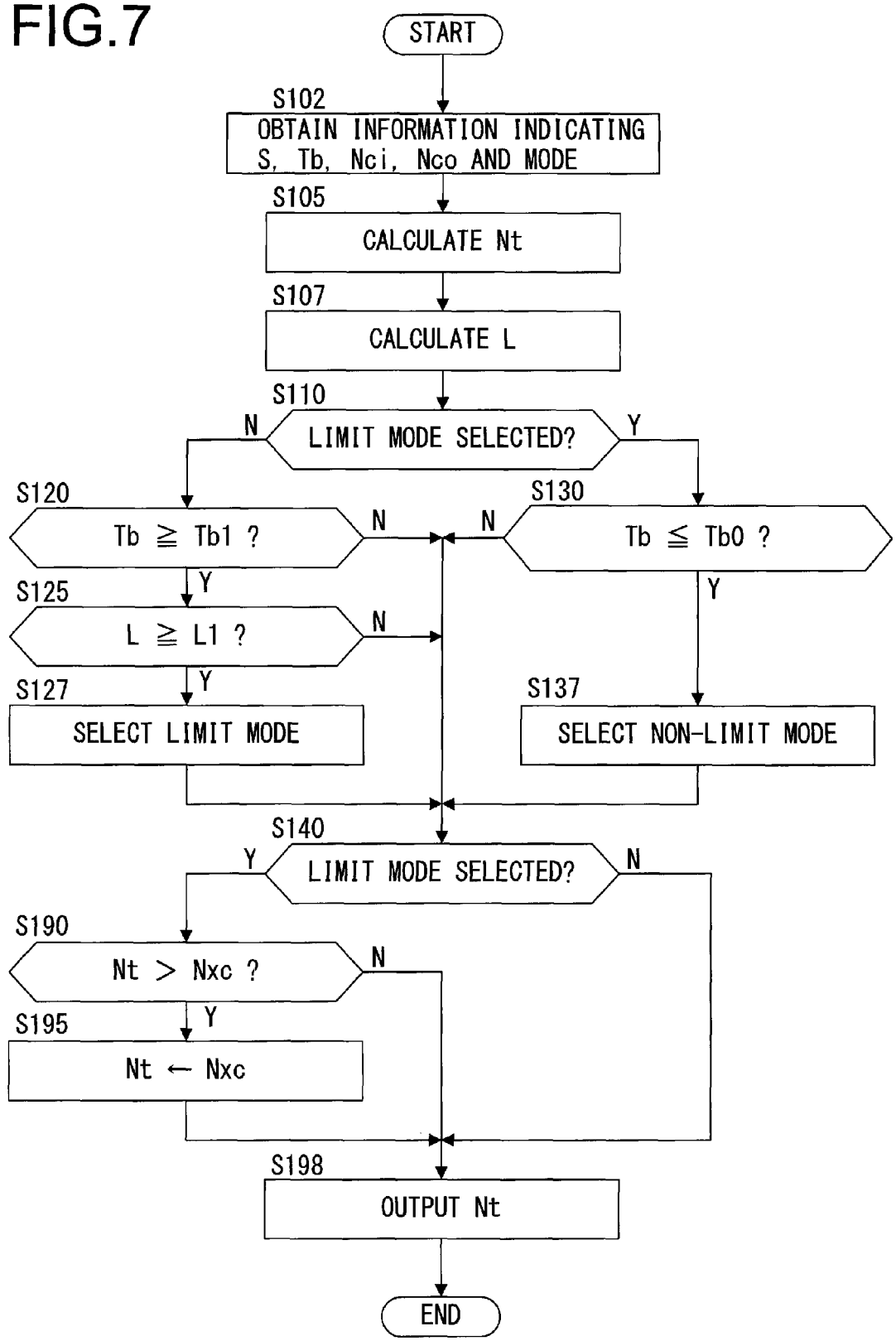

FIG. 7 is a flowchart of the operation of the limit control processing executed to limit the maximum engine rotation speed by the controller in the wheel loader achieved in (variation 2) of the first embodiment of the present invention. The flowchart presented in FIG. 7 includes the processing executed in step S102, replacing the processing in step S100 in the flowchart presented in FIG. 5, the processing executed in step S107 added between step S105 and step S110, and the processing executed in step S125 added between step S120 and step S127.

As shown in FIG. 7, in step 102 the controller 100 reads information indicating the pedal operation quantity S at the accelerator pedal 152 detected by the accelerator operation quantity detector 152a and information indicating the input rotation speed Nci and the output rotation speed Nco respectively detected by the rotation speed detectors 14 and 15. In step S102, the controller 100 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Furthermore, the controller 100 reads mode information (limit mode/non-limit mode) in step S102. Upon completing the read of the various types of information in step S102, the operation proceeds to step S105.

Once the processing in step S105 (Nt calculation) is executed, the operation proceeds to step S107, in which the controller 100 calculates the traveling load L based upon the input rotation speed Nci and the output rotation speed Nco before the operation proceeds to step S110.

Upon making an affirmative decision in step S120, the operation proceeds to step S125, in which the controller 100 makes a decision as to whether or not the traveling load L is equal to or greater than the threshold value L1. If an affirmative decision is made in step S125, i.e., if it is decided that the limit conditions exist, the operation proceeds to step S127, whereas if a negative decision is made in step S125, i.e., if it is decided that the limit conditions do not exist, the operation proceeds to step S140.

In addition to advantages and operations similar to those achieved in the first embodiment, advantages and operations described in (3) and (4) below are achieved through (variation 2) of the first embodiment described above.

(3) Since less heat is generated as the brakes are engaged while the vehicle is traveling under low load, i.e., when the traveling load L is less than the threshold value L1, compared to the amount of heat generated from braking when the vehicle is traveling under high load with the traveling load L matching or exceeding the threshold value L1, the brake cooling oil temperature does not rise readily in the low-load traveling state. In this variation, the maximum rotation speed of the engine 190 is not limited even if the cooling oil temperature Tb is equal to or higher than the threshold value Tb1, as long as the traveling load L is less than the threshold value L1, making it possible to achieve better work efficiency over the first embodiment.

(4) A work vehicle such as a wheel loader typically operates with a great deal of stop/start running. This variation achieves an added advantage of reducing the frequency of braking operation performed by the operator under high traveling load conditions, such as when the vehicle is being started or stopped, by limiting the maximum rotation speed of the engine 190 and thus restricting acceleration. As a result, an increase in the cooling oil temperature can be even more effectively suppressed.

—(Variation 3) of First Embodiment—

In reference to FIG. 2 and FIG. 8, the prime mover control device achieved in (variation 3) of the first embodiment will be described. The work vehicle in (variation 3) of the first embodiment assumes a structure similar to that of the work vehicle achieved in the first embodiment (see FIG. 2).

This variation is achieved by combining (variation 1) and (variation 2) of the first embodiment described earlier. Namely, in (variation 3) of the first embodiment, the maximum rotation speed of the engine 190 is not limited even when the cooling oil temperature Tb is equal to or higher than the threshold value Tb1, as long as the vehicle speed V detected by the vehicle speed sensor 16 shown in FIG. 2 is lower than the threshold value V1 and the traveling load L calculated by the traveling load calculation unit 100b is less than the threshold value L1.

When the mode setting is the "non-limit mode", the mode setting unit 100e makes a decision as to whether or not the cooling oil temperature Tb is equal to or higher than the threshold value Tb1, whether or not the vehicle speed V is equal to or higher than the threshold value V1 and whether or not the traveling load L is equal to or higher than the threshold value L1. If it is decided in the "non-limit mode" that the cooling oil temperature Tb is equal to or higher than the threshold value Tb1, the vehicle speed V is equal to or greater than the threshold value V1 and the traveling load L is equal to or higher than the threshold value L1, the mode setting unit 100e decides that limit conditions exist and sets the control mode for the engine rotation speed to the "limit mode".

Figure 8:
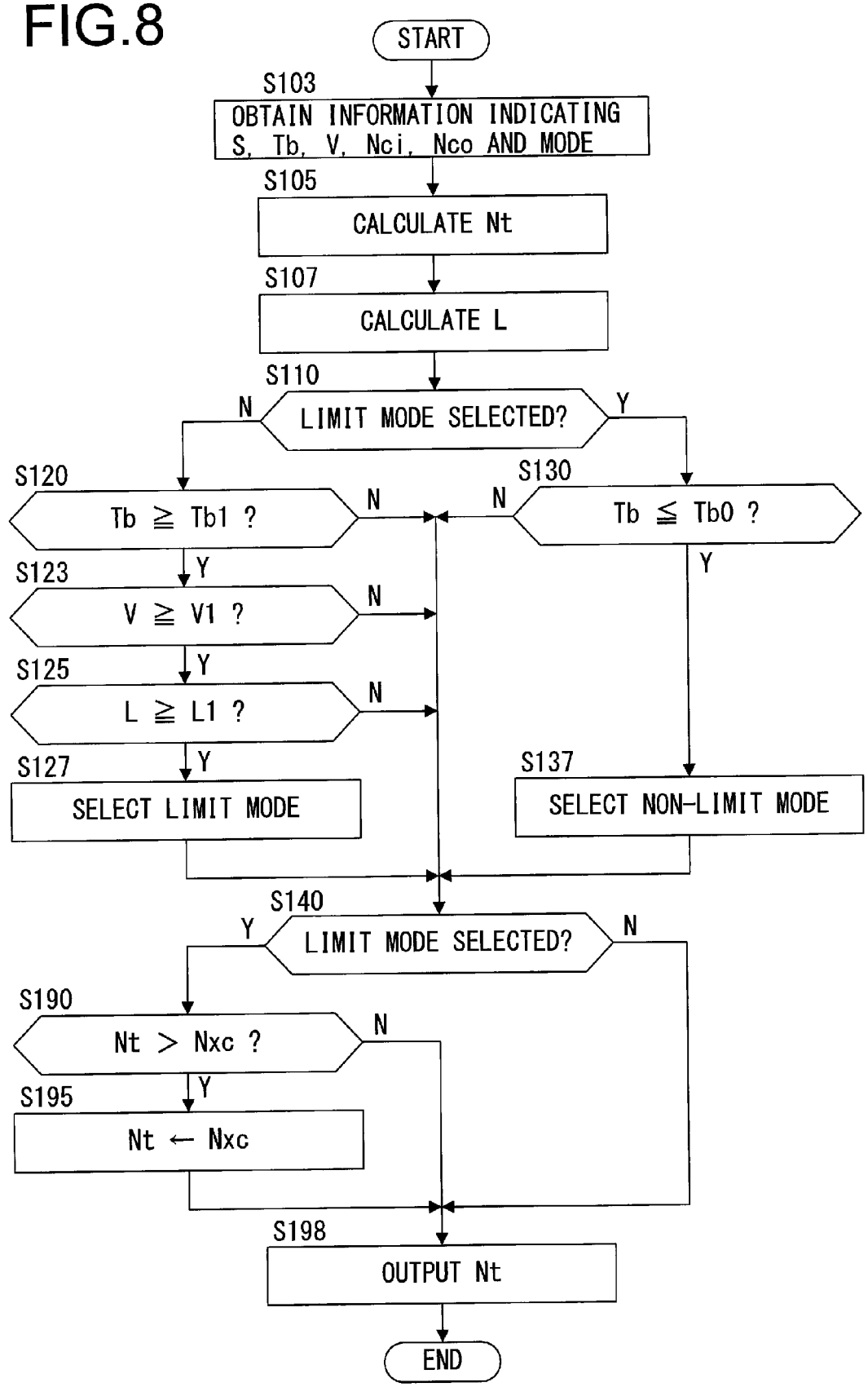

FIG. 8 is a flowchart of the operation of the limit control processing executed to limit the maximum engine rotation speed by the controller in the wheel loader achieved in (variation 3) of the first embodiment of the present invention. The flowchart presented in FIG. 8 includes the processing executed in step S103, replacing the processing in step S100 in the flowchart presented in FIG. 5, the processing executed in step S107 added between step S105 and step S110, and the processing executed in step S123 and step S125 added between step S120 and step S127.

As shown in FIG. 8, in step S103, the controller 100 reads information indicating the pedal operation quantity S at the accelerator pedal 152 detected by the accelerator operation quantity detector 152a, information indicating the vehicle speed V detected by the vehicle speed sensor 16 and information indicating the input rotation speed Nci and the output rotation speed Nco respectively detected by the rotation speed detectors 14 and 15. In step S103, the controller 100 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Furthermore, the controller 100 reads mode information (limit mode/non-limit mode) in step S103. Upon completing the read of the various types of information in step S103, the operation proceeds to step S105.

Upon making an affirmative decision in step S120, the operation proceeds to step S123, in which the controller 100 makes a decision as to whether or not the vehicle speed is equal to or higher than the threshold value V1. Upon making an affirmative decision in step S123, the operation proceeds to step S125, whereas upon making a negative decision in step S123, the operation proceeds to step S140.

In step S125, the controller 100 makes a decision as to whether or not the traveling load L is equal to or greater than the threshold value L1. If an affirmative decision is made in step S125, i.e., if it is decided that the limit conditions exist, the operation proceeds to step S127, whereas if a negative decision is made in step S125, i.e., if it is decided that the limit conditions do not exist, the operation proceeds to step S140.

Advantages and operations similar to those of (variation 1) and (variation 2) of the first embodiment are achieved through (variation 3) of the first embodiment described above.

—Second Embodiment—

In reference to FIG. 2 and FIGS. 9 through 11, the prime mover control device achieved in the second embodiment will be described. It is to be noted that in these figures, the same reference numerals are assigned to elements identical to or equivalent to those in the first embodiment and that the following explanation will focus on features different from those of the first embodiment. The work vehicle achieved in the second embodiment assumes a structure similar to that of the work vehicle achieved in the first embodiment (see FIG.

2). In the first embodiment, a fixed value is taken as the limit value Nxc used to limit the maximum rotation speed of the engine 190. In contrast, the limit value changes in correspondence to the cooling oil temperature Tb in the second embodiment. This aspect of the embodiment will be described in detail below.

Figure 9:
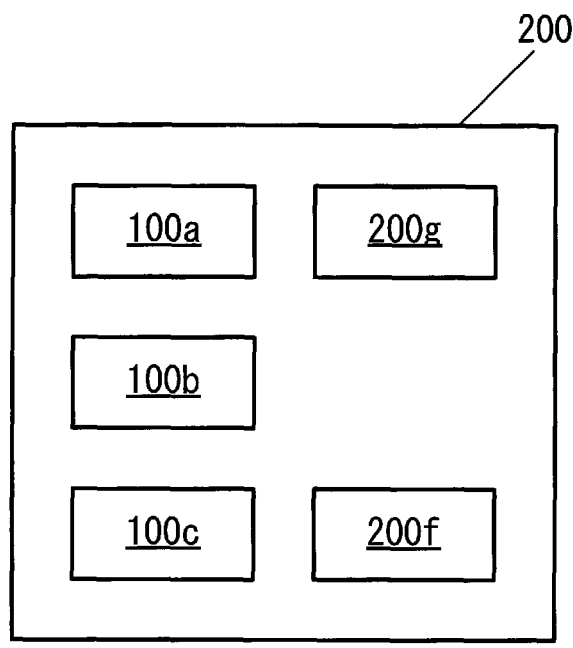

FIG. 9 is a functional block diagram pertaining to a controller 200 in the wheel loader achieved in the second embodiment of the present invention. The wheel loader in the second embodiment is equipped with the controller 200 instead of the controller 100 described in reference to the first embodiment. The controller 200 has functions achieved in the form of a limit value calculation unit 200g and a correction unit 200f in place of the mode determination unit 100d, the mode setting unit 100e and the correction unit 100f described in reference to the first embodiment.

Figure 10:
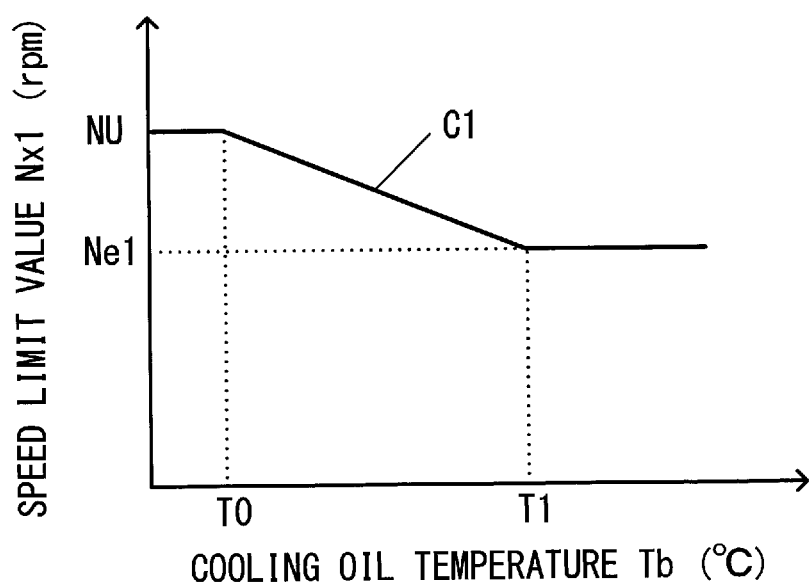

FIG. 10 is a diagram indicating the relationship between the temperature of the cooling oil and a speed limit value. A table of temperature reference characteristics C1, i.e., the characteristics of the relation of a speed limit value Nx1 to the cooling oil temperature Tb indicated in FIG. 10, is stored in a storage device at the controller 200. The limit value calculation unit 200g calculates the speed limit value Nx1 based upon the average value Tb of the cooling oil temperatures detected via the oil temperature sensors 163a and 163b by referencing the table of the temperature reference characteristics C1. When the cooling oil temperature Tb is equal to or lower than T0, the speed limit value Nx1 is set to the upper limit value NU. As the cooling oil temperature Tb rises, the speed limit value Nx1 is lowered. In other words, as the cooling oil temperature Tb increases, the limiting extent ΔN (see FIG. 4) increases. When the cooling oil temperature Tb is equal to or higher than T1, the speed limit value Nx1 is set to Ne1. Namely, the speed limit value Nx1 changes within a range between the upper limit value NU and Ne1 as the cooling oil temperature changes. The value taken for Ne1 is smaller than NU and greater than NL (NL<Ne1<NU). It is desirable that Ne1 be set to a value higher than the engine rotation speed corresponding to the rated torque output point (maximum torque point).

The correction unit 200f compares the target engine rotation speed Nt with the speed limit value Nx1, and if the target engine rotation speed Nt is higher than the speed limit value Nx1, it resets, i.e., corrects, the target engine rotation speed Nt to the speed limit value Nx1. If the target engine rotation speed Nt is equal to or lower than the speed limit value Nx1, the correction unit 200f does not make any correction.

Figure 11:
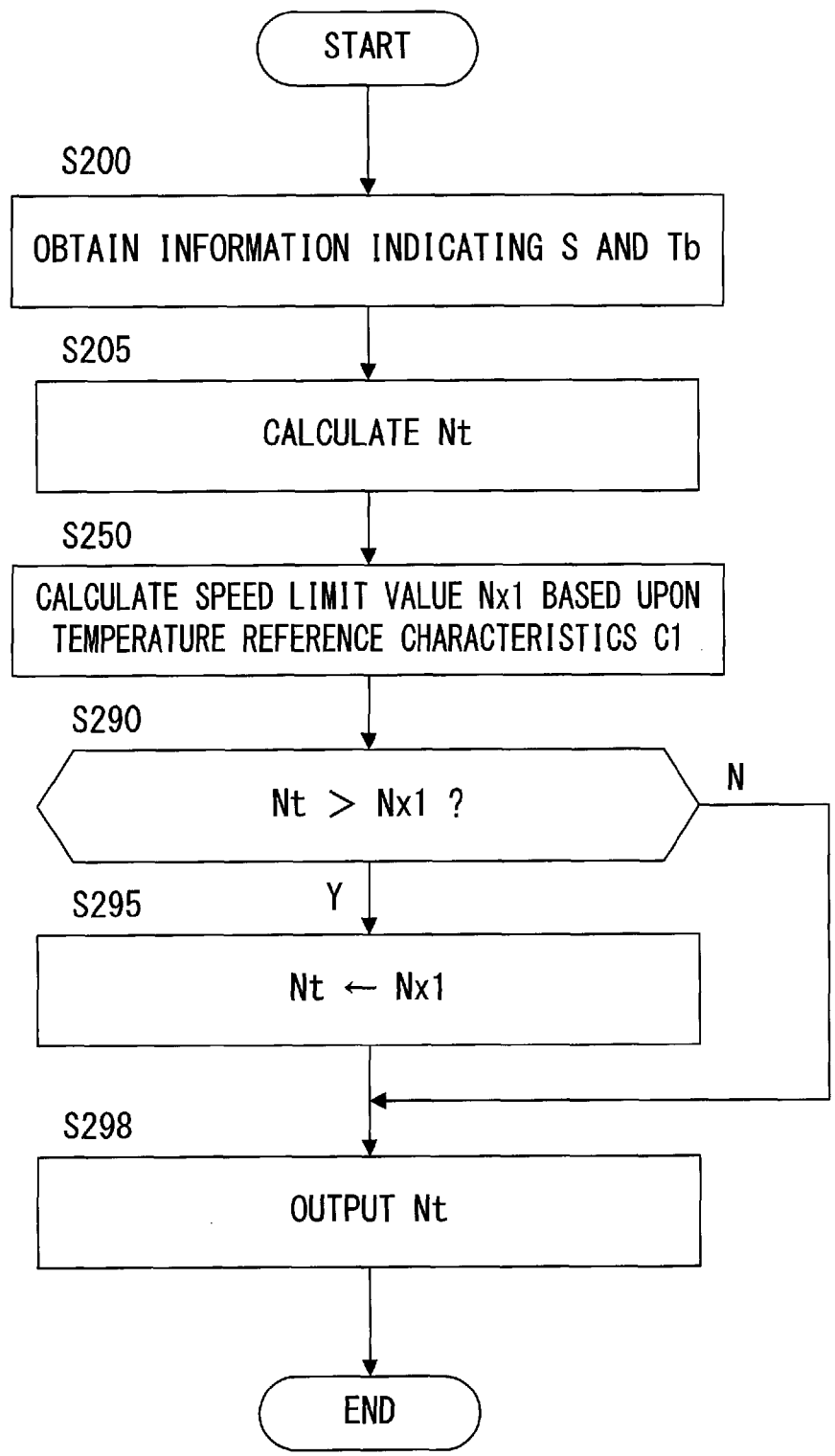

FIG. 11 is a flowchart of the operation of the limit control processing executed to limit the maximum engine rotation speed by the controller in the wheel loader achieved in the second embodiment of the present invention. After an ignition switch (not shown) is turned on, initial settings are established (not shown), and then a program enabling the processing shown in FIG. 11 is started up and is repeatedly executed by the controller 200.

In step S200, the controller 200 reads information indicating the pedal operation quantity S at the accelerator pedal 152 detected by the accelerator operation quantity detector 152a. In step S200, the controller 200 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S200, the operation proceeds to step S205.

In step S205 (Nt calculation), the controller 200 executes processing similar to that executed in step S105 (Nt calculation) in FIG. 5, before the operation proceeds to step S250.

In step S250, the controller 200 calculates the speed limit value Nx1 based upon the cooling oil temperature Tb by referencing the temperature reference characteristics C1 and then the operation proceeds to step S290.

In step S290, the controller 200 makes a decision as to whether or not the target engine rotation speed Nt, having been calculated in step S205, is higher than the speed limit value Nx1 calculated in step S250. If an affirmative decision is made in step S290, the operation proceeds to step S295, whereas if a negative decision is made in step S290, the operation proceeds to step S298.

In step S295, the controller 200 sets the speed limit value Nx1 as the target engine rotation speed Nt, before the operation proceeds to step S298.

In step S298, the controller 200 outputs a control signal corresponding to the target engine rotation speed Nt to the engine controller 190a. The engine controller 190a controls the fuel injection system (not shown) so as to adjust the actual engine rotation speed at the engine 190 toward the target engine rotation speed Nt provided by the controller 200.

In addition to advantages and operations similar to those achieved in the first embodiment, advantages and operations described in (5) below are achieved through the second embodiment described above.

(5) The maximum rotation speed of the engine 190 is limited or reduced to a value that is set to a lower value when the temperature of the cooling oil is higher. As a result, highly precise control can be executed in correspondence to the temperature of the brake cooling oil.

—(Variation 1) of Second Embodiment—

In reference to FIG. 2, FIG. 12 and FIG. 13, the prime mover control device achieved in (variation 1) of the second embodiment will be described. The work vehicle in (variation 1) of the second embodiment assumes a structure similar to that of the work vehicle achieved in the second embodiment (see FIG. 2). The following explanation will focus on features different from those of the second embodiment.

In the second embodiment, the maximum rotation speed of the engine 190 is limited so as not to exceed a limit that is set to a lower value as the temperature Tb of the cooling oil increases.

In contrast, the maximum rotation speed of the engine 190 is not limited in (variation 1) of the second embodiment even when the cooling oil temperature Tb is higher than the threshold value T0, as long as the vehicle speed V detected by the vehicle speed sensor 16 shown in FIG. 2 is lower than the threshold value V1.

Figure 12:
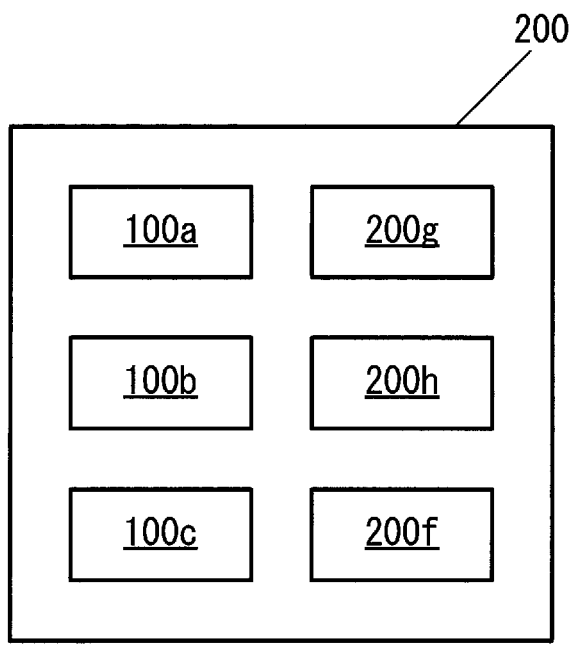

FIG. 12 is a functional block diagram pertaining to the controller 200 in the wheel loader achieved in (variation 1) of the second embodiment of the present invention. As shown in FIG. 12, the controller 200 in the wheel loader achieved in (variation 1) of the second embodiment has a further function achieved in the form of a mode control unit 200h.

The mode control unit 200h makes a decision as to whether or not the vehicle speed V is equal to or higher than the threshold value V1. Upon deciding that the vehicle speed V is equal to or higher than the threshold value V1, the mode control unit 200h decides that limit conditions exist and accordingly sets the control mode for the engine rotation speed to the "limit mode". Upon deciding that the vehicle speed V is lower than the threshold value V1, the mode control unit 200h decides that the limit conditions do not exist and sets the control mode for the engine rotation speed to the "non-limit mode". The threshold value V1 is stored in advance in a storage device at the controller 200.

When the control mode for the engine rotation speed is set in the "limit mode", the correction unit 200f compares the target engine rotation speed Nt with the speed limit value Nx1, and if the target engine rotation speed Nt is higher than the speed limit value Nx1, it resets, i.e., corrects, the target engine rotation speed Nt to the speed limit value Nx1. If the target engine rotation speed Nt is equal to or lower than the speed limit value Nx1, the correction unit 200f does not make any correction. In addition, if the control mode for the engine rotation speed is currently set in the "non-limit mode", the correction unit 200f does not make any correction. Namely, in the "non-limit mode", the actual engine rotation speed is controlled in reference to the target engine rotation speed Nt (within the range between the low idle value and the upper limit value NU) corresponding to the pedal operation quantity S.

Figure 13:
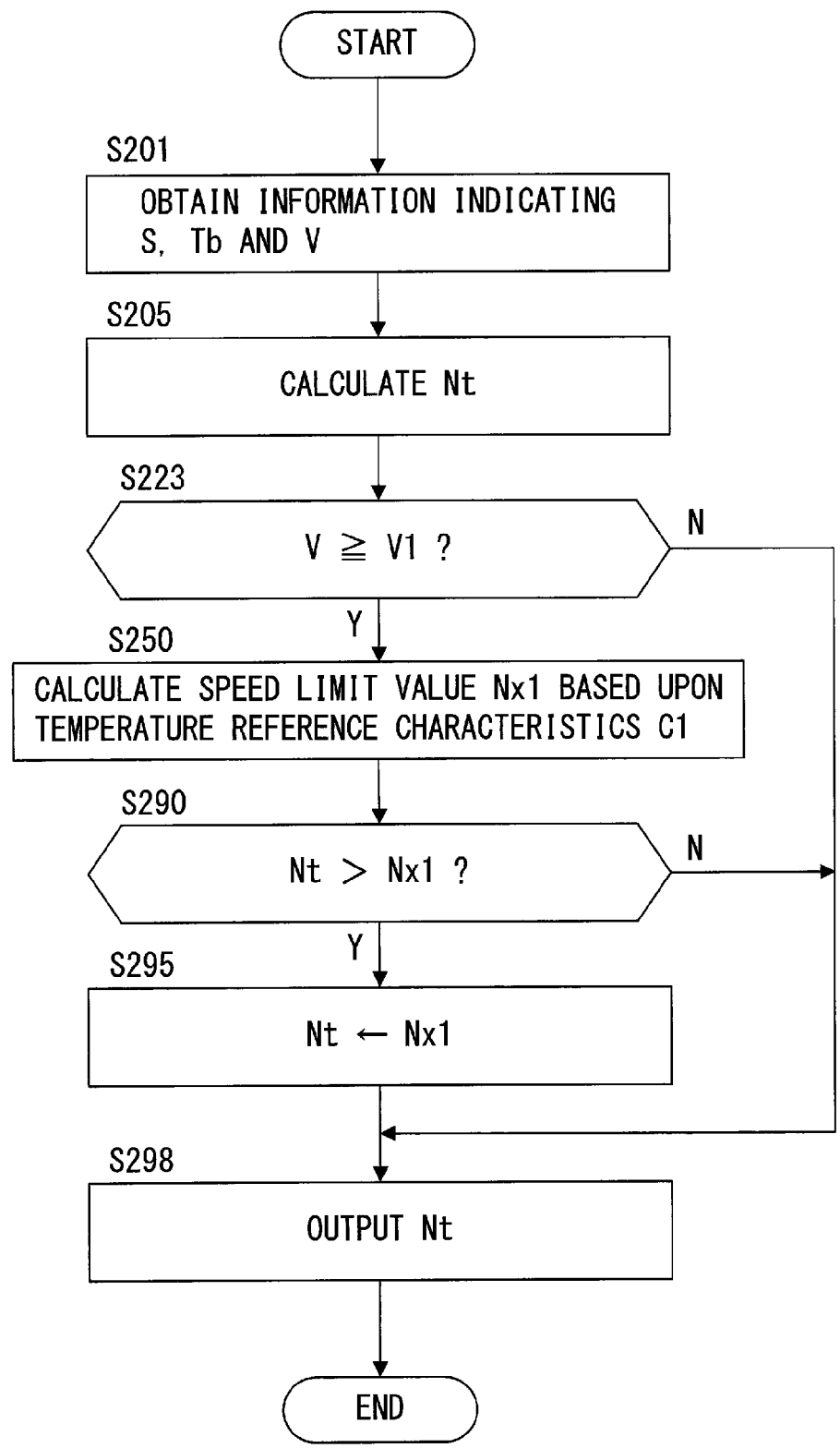

FIG. 13 is a flowchart of the operation of the limit control processing executed to limit the maximum engine rotation speed by the controller in the wheel loader achieved in (variation 1) of the second embodiment of the present invention. The flowchart presented in FIG. 13 includes the processing executed in step S201, replacing the processing in step S200 in the flowchart presented in FIG. 11, and also includes the processing executed in step S223 added between step S205 and step S250.

As shown in FIG. 13, in step S201, the controller 200 reads information indicating the pedal operation quantity S at the accelerator pedal 152 detected by the accelerator operation quantity detector 152a and information indicating the vehicle speed V detected by the vehicle speed sensor 16. In step S201, the controller 200 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S201, the operation proceeds to step S205.

In step S223, the controller 200 makes a decision as to whether or not the vehicle speed V is equal to or higher than the threshold value V1. If an affirmative decision is made in step S223, the limit mode is selected (not shown) and then the operation proceeds to step S250, whereas if a negative decision is made in step S223, the nonlimit mode is selected (not shown) and then the operation proceeds to step S298.

In addition to advantages and operations similar to those achieved in the second embodiment, advantages and operations described in (6) below are achieved through (variation 1) of the second embodiment described above.

(6) Since less heat is generated as the brakes are engaged in operation while the vehicle is traveling at low speed, i.e., when the vehicle speed V is lower than the threshold value V1, compared to the amount of heat generated from braking when the vehicle is traveling at high speed with the vehicle speed V matching or exceeding the threshold value V1, the brake cooling oil temperature does not rise readily in the low-speed traveling state. In this variation, the maximum rotation speed of the engine 190 is not limited even if the cooling oil temperature Tb is higher than the threshold value Tb0, as long as the vehicle speed V is lower than the threshold value V1, making it possible to achieve better work efficiency over the second embodiment.

—(Variation 2) of Second Embodiment—

In reference to FIG. 2, FIG. 12 and FIG. 14, the prime mover control device achieved in (variation 2) of the second embodiment will be described. The work vehicle in (variation 2) of the second embodiment assumes a structure similar to that of the work vehicle achieved in (variation 1) of the second embodiment (see FIG. 2 and FIG. 12). The following explanation will focus on features different from those of (variation 1) of the second embodiment.

Upon deciding that the traveling load L is equal to or greater than the threshold value L1, the mode control unit 200h in (variation 2) of the second embodiment, decides that limit conditions exist and accordingly sets the control mode for the engine rotation speed to the "limit mode". Upon deciding that the traveling load L is less than the threshold value L1, the mode control unit 200h decides that the limit conditions do not exist and sets the control mode for the engine rotation speed to the "non-limit mode". The threshold value L1 is stored in advance in a storage device at the controller 200.

Figure 14:
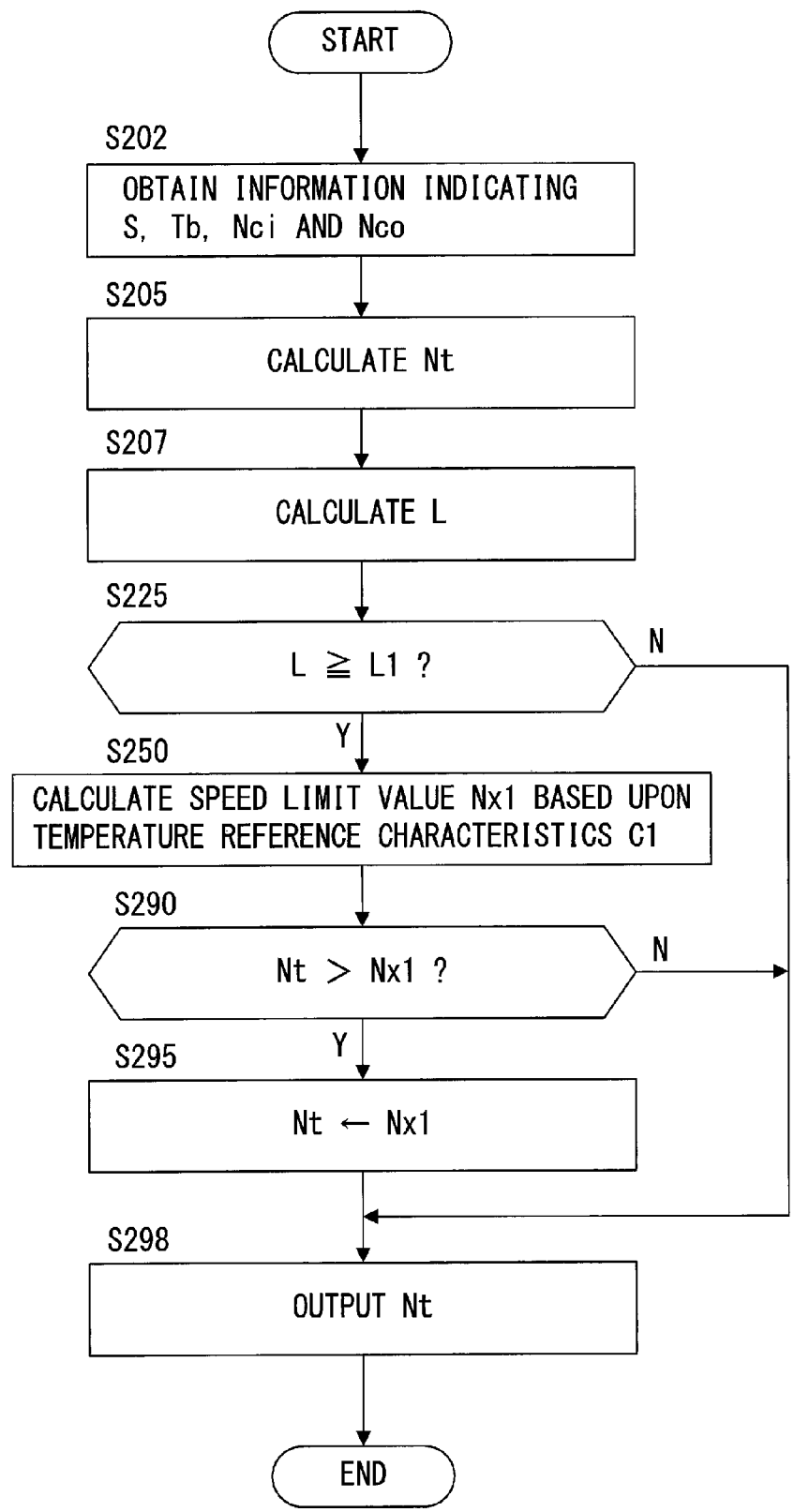

FIG. 14 is a flowchart of the operation of the limit control processing executed to limit the maximum engine rotation speed by the controller in the wheel loader achieved in (variation 2) of the second embodiment of the present invention. The flowchart presented in FIG. 14 includes the processing executed in steps S202 and S225 replacing steps S201 and S223 in the flowchart presented in FIG. 13 and the processing executed in step S207 added between step S205 and step S225.

As shown in FIG. 14, the controller 200 reads information indicating the pedal operation quantity S at the accelerator pedal 152 detected by the accelerator operation quantity detector 152a and information indicating the input rotation speed Nci and the output rotation speed Nco respectively detected by the rotation speed detectors 14 and 15. In step S202, the controller 200 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S202, the operation proceeds to step S205.

Once the processing in step S205 (Nt calculation) is executed, the operation proceeds to step S207, in which the controller 200 calculates the traveling load L based upon the input rotation speed Nci and the output rotation speed Nco before the operation proceeds to step S225.

In step 225, the controller 200 makes a decision as to whether or not the traveling load L is equal to or greater than the threshold value L1. If an affirmative decision is made in step S225, the limit mode is selected (not shown) and the operation proceeds to step S250, whereas if a negative decision is made in step S225, the non-limit mode is selected (not shown) and the operation then proceeds to step S298.

In addition to advantages and operations similar to those achieved in the second embodiment, advantages and operations described in (7) and (8) below are achieved through (variation 2) of the second embodiment described above.

(7) Since less heat is generated as the brakes are engaged in operation while the vehicle is traveling under low load, i.e., when the traveling load L is less than the threshold value L1, compared to the amount of heat generated from braking when the vehicle is traveling under high load with the traveling load L matching or exceeding the threshold value L1, the brake cooling oil temperature does not rise readily in the low-load traveling state. In this variation, the maximum rotation speed of the engine 190 is not limited even if the cooling oil temperature Tb is higher than the threshold value T0, as long as the traveling load L is less than the threshold value L1, making it possible to achieve better work efficiency over the second embodiment.

(8) A work vehicle such as a wheel loader typically operates with a great deal of stop/start running. This variation achieves an added advantage of reducing the frequency of braking operation performed by the operator under high traveling load conditions, such as when the vehicle is started or stopped by limiting the maximum rotation speed of the engine 190 and thus restricting acceleration. As a result, an increase in the cooling oil temperature can be even more effectively suppressed.

—(Variation 3) of Second Embodiment—

In reference to FIG. 2, FIG. 12 and FIG. 15, the prime mover control device achieved in (variation 3) of the second embodiment will be described. The work vehicle in (variation 3) of the second embodiment assumes a structure similar to that of the work vehicle achieved in (variation 1) of the second embodiment (see FIG. 2 and FIG. 12).

This variation is achieved by combining (variation 1) and (variation 2) of the second embodiment described earlier. Namely, in (variation 3) of the second embodiment, the maximum rotation speed of the engine 190 is not limited even when the cooling oil temperature Tb is higher than the threshold value T0, as long as the vehicle speed V detected by the vehicle speed sensor 16 shown in FIG. 2 is lower than the threshold value V1 and the traveling load L calculated by the traveling load calculation unit 100b is less than the threshold value L1.

If it is decided that the vehicle speed V is equal to or higher than the threshold value V1 and the traveling load L is equal to or greater than the threshold value L1, the mode control unit 200h in (variation 3) of the second embodiment decides that the limit conditions exist and sets the control mode for the engine rotation speed to the "limit mode". If it is decided that the vehicle speed V is lower than the threshold value V1 or that the traveling load L is less than the threshold value L1, the mode control unit 200h decides that the limit conditions do not exist, and sets the control mode for the engine rotation speed to the "non-limit mode".

Figure 15:
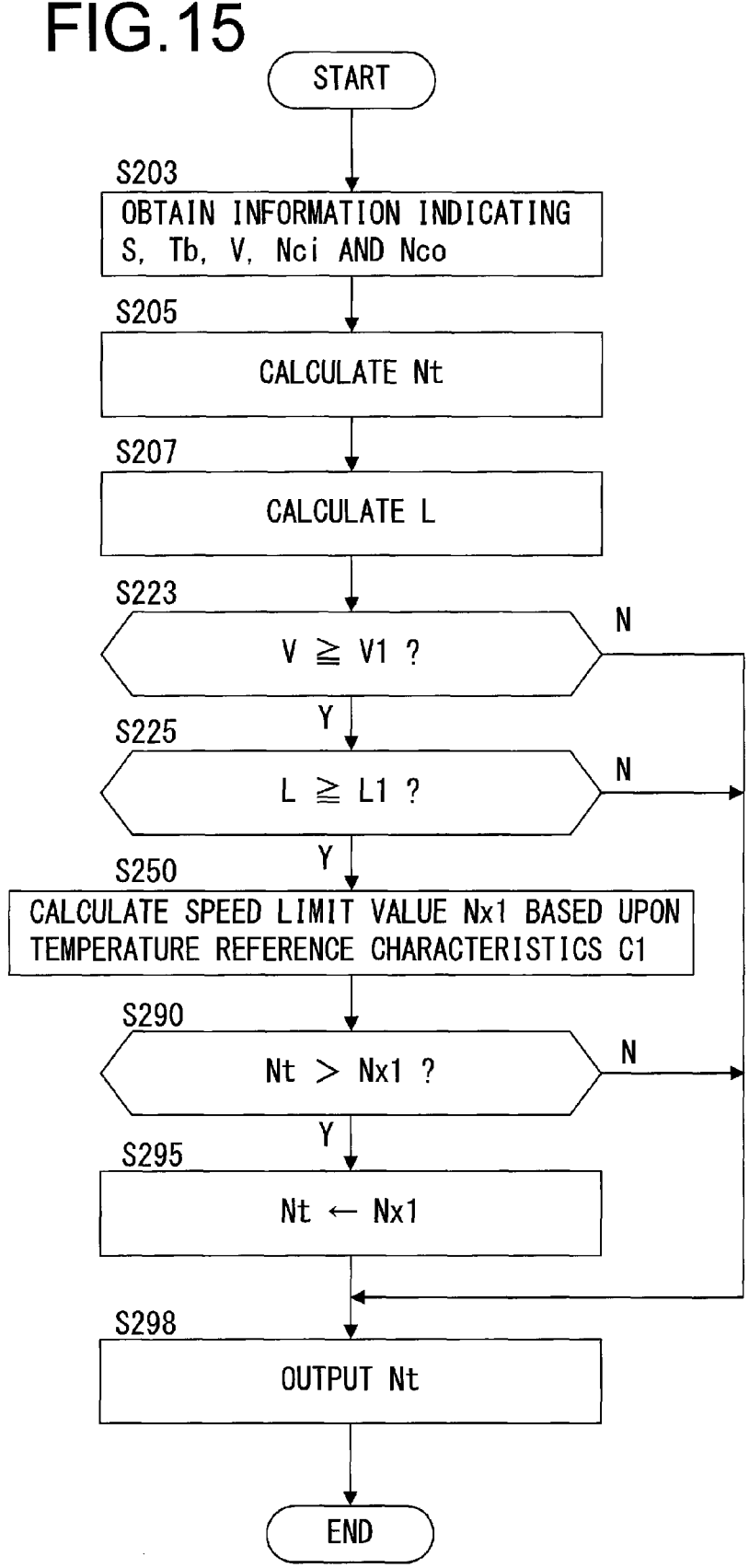

FIG. 15 is a flowchart of the operation of the limit control processing executed to limit the maximum engine rotation speed by the controller in the wheel loader achieved in (variation 3) of the second embodiment of the present invention. The flowchart presented in FIG. 15 includes the processing executed in step S203, replacing the processing in step S202 in the flowchart presented in FIG. 14, and the processing executed in step S223 added between step S207 and step S225.

As shown in FIG. 15, in step S203, the controller 200 reads information indicating the pedal operation quantity S at the accelerator pedal 152 detected by the accelerator operation quantity detector 152a, information indicating the vehicle speed V detected by the vehicle speed sensor 16 and information indicating the input rotation speed Nci and the output rotation speed Nco respectively detected by the rotation speed detectors 14 and 15. In step S203, the controller 200 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S203, the operation proceeds to step S205.

When the processing in step S207 (L calculation) is executed as has been described in reference to (variation 2) of the second embodiment, the operation proceeds to step S223 in which the controller 200 makes a decision as to whether or not the vehicle speed V is equal to or higher than the threshold value V1. Upon making an affirmative decision in step S223, the operation proceeds to step S225, whereas upon making a negative decision in step S223, the operation proceeds to step S298.

In step S225, the controller 200 makes a decision as to whether or not the traveling load L is equal to or greater than the threshold value L1. Upon making an affirmative decision in step S225, the operation proceeds to step S250, whereas upon making a negative decision in step S225, the operation proceeds to step S298.

Advantages and operations similar to those of (variation 1) and (variation 2) of the second embodiment are achieved through (variation 3) of the second embodiment described above.

—Third Embodiment—

In reference to FIG. 2 and FIGS. 16 through 18, the prime mover control device achieved in the third embodiment will be described. It is to be noted that in these figures, the same reference numerals are assigned to elements identical to or equivalent to those in the first embodiment and that the following explanation will focus on features distinct from those of the first embodiment. The work vehicle achieved in the third embodiment assumes a structure similar to that of the work vehicle achieved in the first embodiment (see FIG. 2).

Figure 16:
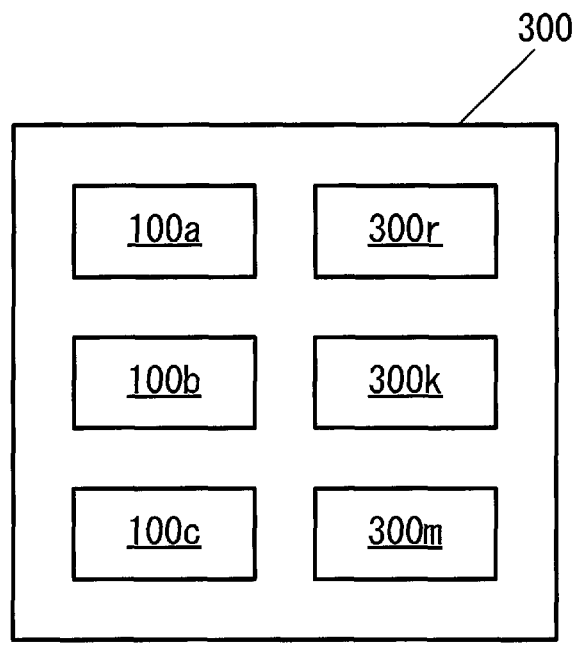

FIG. 16 is a functional block diagram pertaining to a controller 300 in the wheel loader achieved in the third embodiment of the present invention. The wheel loader in the third embodiment is equipped with the controller 300 instead of the controller 100 described in reference to the first embodiment. The controller 300 has functions achieved in the form of a limit value calculation unit 300r, a selection unit 300k and a correction unit 300m in place of the mode determination unit 100d, the mode setting unit 100e and the correction unit 100f described in reference to the first embodiment.

FIG. 17(a) is a diagram similar to that in FIG. 10, indicating the relationship between the cooling oil temperature and a first speed limit value. FIG. 17(b) is a diagram indicating the relationship between the vehicle speed and a second speed limit value. A table of temperature reference characteristics C1, i.e., the characteristics of the relation of the first speed limit value Nx1 to the cooling oil temperature Tb indicated in FIG. 17(a), is stored in a storage device at the controller 300. The limit value calculation unit 300r calculates the first speed limit value Nx1 based upon the average value Tb of the cooling oil temperatures detected via the oil temperature sensors 163a and 163b by referencing the table of the temperature reference characteristics C1. When the cooling oil temperature Tb is equal to or lower than T0, the first speed limit value Nx1 is set to the upper limit value NU. As the cooling oil temperature Tb rises, the first speed limit value Nx1 is lowered. In other words, as the cooling oil temperature Tb increases, the limiting extent $\Delta N$ (see FIG. 4) increases. When the cooling oil temperature Tb is equal to or higher than T1, the first speed limit value Nx1 is set to Ne1. Namely, the first speed limit value Nx1 changes within a range between the upper limit value NU and Ne1 as the cooling oil temperature changes. The value taken for Ne1 is smaller than NU and is greater than NL (NL<Ne1<NU). It is desirable that Ne1 be set to a value higher than the engine rotation speed corresponding to the rated torque output point (maximum torque point).

A table of vehicle speed reference characteristics C2, i.e., the characteristics of the relation of the second speed limit value Nx2 to the vehicle speed V shown in FIG. 17(b), is stored in a storage device at the controller 300. The limit value calculation unit 300r calculates the second speed limit value Nx2 based upon the vehicle speed V detected by the vehicle speed sensor 16 by referencing the table of the vehicle speed reference characteristics C2. When the vehicle speed V is equal to or lower than V0, the second speed limit value Nx2 is set to the upper limit value NU. As the vehicle speed V rises, the second speed limit value Nx2 is lowered. In other words, as the vehicle speed V increases, the limiting extent ΔN (see FIG. 4) increases. When the vehicle speed V is equal to or higher than V1, the second speed limit value Nx2 is set to Ne2. Namely, the second speed limit value Nx2 changes within a range between the upper limit value NU and Ne2 as the vehicle speed changes. The value taken for Ne2 is smaller than NU and is greater than NL (NL<Ne2<NU). It is desirable that Ne2 be set to a value higher than the engine rotation speed corresponding to the rated torque output point (maximum torque point). In addition, while the same value may be taken for Ne1 and Ne2, either may take a value greater than the other in consideration of other factors such as the cooling oil temperature and the extent to which the cooling oil temperature rises in correspondence to the vehicle speed.

The selection unit 300k compares the first speed limit value Nx1 with the second speed limit value Nx2, selects the lower value and sets the selected limit value as a selected limit value Nc.

The correction unit 300m compares the target engine rotation speed Nt with the selected limit value Nc, and if the target engine rotation speed Nt is higher than the selected limit value Nc, it resets, i.e., corrects, the target engine rotation speed Nt to the selected limit value Nc. If the target engine rotation speed Nt is equal to or lower than the selected limit value Nc, the correction unit 300m does not make any correction.

Figure 18:
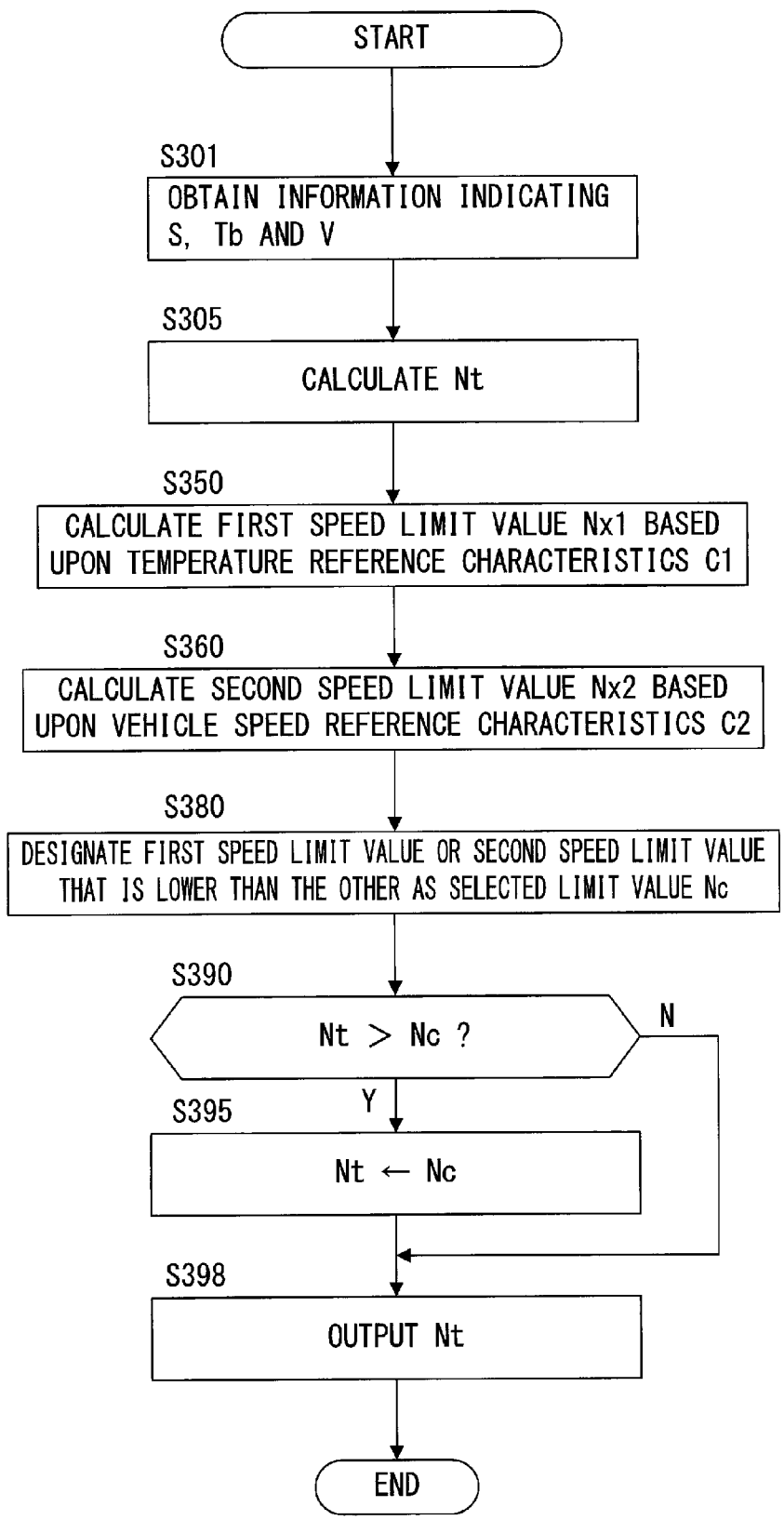
FIG. 18 A flowchart of the operation of the limit control processing executed to limit the maximum engine rotation speed by the controller in the wheel loader in the third embodiment of the present invention FIG. 19 A diagram indicating the relationship between the traveling load and a third speed limit value FIG. 20 A flowchart of the operation of the limit control processing executed to limit the maximum engine rotation speed by the controller in the wheel loader in (variation 1) of the third embodiment of the present invention FIG. 21 A flowchart of the operation of the limit control processing executed to limit the maximum engine rotation speed by the controller in the wheel loader in (variation 2) of the third embodiment of the present invention FIG. 22 A flowchart of the operation of the limit control processing executed to limit the maximum engine rotation speed by the controller in a wheel loader achieved as a variation of the present invention

FIG. 18 is a flowchart of the operation of the limit control processing executed to limit the maximum engine rotation speed by the controller in the wheel loader achieved in the third embodiment of the present invention. After an ignition switch (not shown) is turned on, initial settings are established (not shown), and then a program enabling the processing shown in FIG. 18 is started up and is repeatedly executed by the controller 300.

In step S301, the controller 300 reads information indicating the pedal operation quantity S at the accelerator pedal 152 detected by the accelerator operation quantity detector 152a and information indicating the vehicle speed V detected by the vehicle speed sensor 16. In step S301, the controller 300 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S301, the operation proceeds to step S305.

In step S305 (Nt calculation), the controller 300 executes processing similar to that executed in step S105 (Nt calculation) in FIG. 5, before the operation proceeds to step S350.

In step S350, the controller 300 calculates the first speed limit value Nx1 based upon the cooling oil temperature Tb by referencing the temperature reference characteristics C1 and the operation proceeds to step S360.

In step S360, the controller 300 calculates the second speed limit value Nx2 based upon the vehicle speed V by referencing the vehicle speed reference characteristics C2 and the operation then proceeds to step S380.

In step S380, the controller 300 sets either the first speed limit value Nx1 or the second speed limit value Nx2 that is lower than the other as the selected speed limit value Nc and then the operation proceeds to step S390.

In step S390, the controller 300 makes a decision as to whether or not the target engine rotation speed Nt, having been calculated in step S305, is higher than the selected speed limit value Nc determined in step S380. If an affirmative decision is made in step S390, the operation proceeds to step S395, whereas if a negative decision is made in step S390, the operation proceeds to step S398.

In step S395, the controller 300 sets the selected limit value Nc as the target engine rotation speed Nt, before the operation proceeds to step S398.

In step S398, the controller 300 outputs a control signal corresponding to the target engine rotation speed Nt to the engine controller 190a. The engine controller 190a controls the fuel injection system (not shown) so as to adjust the actual engine rotation speed at the engine 190 toward the target engine rotation speed Nt provided by the controller 300.

In addition to advantages and operations similar to those achieved in the first embodiment, advantages and operations described in (9) below are achieved through the third embodiment described above.

(9) The maximum rotation speed of the engine 190 is limited either under temperature reference control, through which the maximum rotation speed of the engine 190 is controlled so as not to exceed a limit that is set to a lower value when the temperature of the cooling oil is higher, or under vehicle speed reference control, through which the maximum rotation speed of the engine 190 is controlled so as not to exceed a limit that is set to a lower value when the vehicle speed is higher, by switching to the control under which the maximum rotation speed of the engine 190 is limited to a lower level. Through these measures, highly precise control can be executed in correspondence to the brake cooling oil temperature and the vehicle speed.

Since more heat is generated during braking while the vehicle is traveling at high speed, compared to the amount of heat generated from braking while the vehicle is traveling at low speed, the brake cooling oil temperature tends to rise more readily at high speed. In the variation, a limit is imposed on the maximum rotation speed of the engine 190 in a high-speed traveling state, in which the cooling oil temperature tends to rise more readily, even when the current cooling oil temperature is low, and as a result, an increase in the cooling oil temperature can be effectively suppressed.

—(Variation 1) of Third Embodiment—

In reference to FIG. 2, FIG. 16, FIG. 19 and FIG. 20, the prime mover control device achieved in variation 1 of the third embodiment will be described. The work vehicle in (variation 1) of the third embodiment assumes a structure similar to that of the work vehicle achieved in the third embodiment (see FIG. 2 and FIG. 16). The following explanation will focus on features different from those of the third embodiment.

In the third embodiment, either the first speed limit value Nx1 calculated based upon the temperature reference characteristics C1 or the second speed limit value Nx2 calculated based upon the vehicle speed reference characteristics C2 that is lower than the other is set as the selected limit value Nc.

In (variation 1) of the third embodiment, either the first speed limit value Nx1 calculated based upon the temperature reference characteristics C1 or a third speed limit value Nx3 calculated based upon load reference characteristics C3, to be described later, that is lower than the other is set as the selected limit value Nc.

Figure 19:
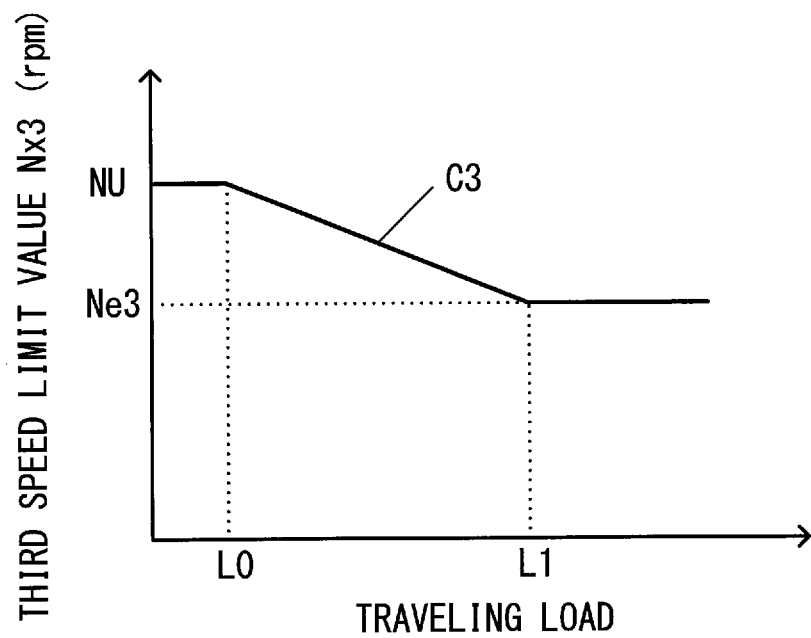

FIG. 19 is a diagram indicating the relationship between the traveling load and the third speed limit value. A table of the load reference characteristics C3, i.e., the characteristics of the relation of the third speed limit value Nx3 to the traveling load L shown in FIG. 19, is stored in a storage device at the controller 300. The limit value calculation unit 300$r$ calculates the third speed limit value Nx3 based upon the traveling load L calculated by the traveling load calculation unit 100$b$ by referencing the table of the load reference characteristics C3. When the traveling load L is equal to or less than L0, the third speed limit value Nx3 is set to the upper limit value NU. As the traveling load L increases, the third speed limit value Nx3 is lowered. In other words, as the traveling load L increases, the limiting extent $\Delta N$ (see FIG. 4) increases. When the traveling load L is equal to or greater than L1, the third speed limit value Nx3 is set to Ne3. Namely, the third speed limit value Nx3 changes within a range between the upper limit value NU and Ne3 as the traveling load changes. The value taken for Ne3 is smaller than NU and is greater than NL (NL<Ne3<NU). It is desirable that Ne3 be set to a value higher than the engine rotation speed corresponding to the rated torque output point (maximum torque point). In addition, while the same value may be taken for Ne1 and Ne3, either may take a value greater than the other in consideration of other factors such as the cooling oil temperature and the extent to which the cooling oil temperature rises in correspondence to the traveling load.

The selection unit 300$k$ compares the first speed limit value Nx1 with the third speed limit value Nx3, selects the lower value and sets the selected limit value as a selected limit value Nc.

Figure 20:
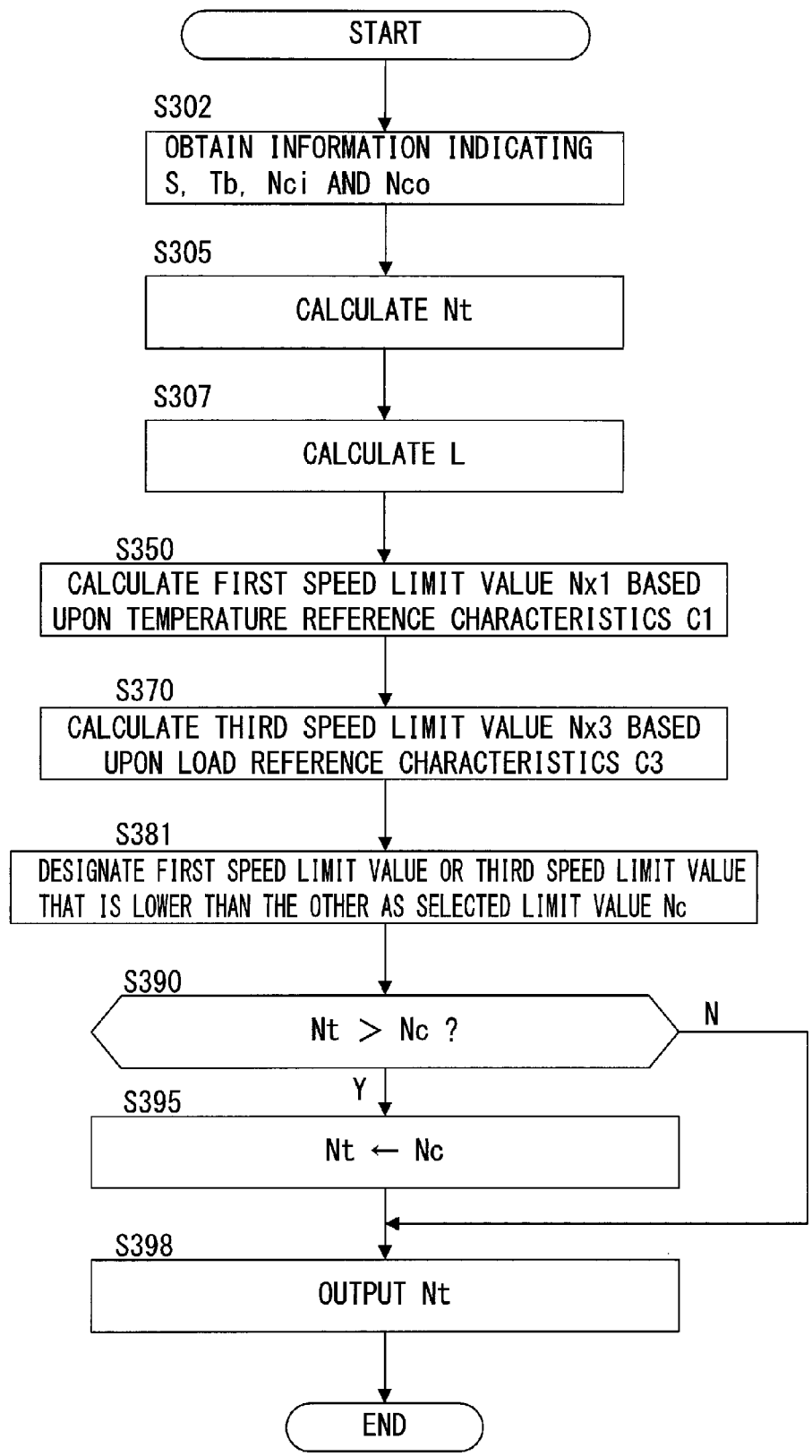

FIG. 20 is a flowchart of the operation of the limit control processing executed to limit the maximum engine rotation speed by the controller in the wheel loader achieved in (variation 1) of the third embodiment of the present invention. The flowchart presented in FIG. 20 includes the processing executed in steps S302, S370 and S381 replacing step S301, S360 and S380 in the flowchart presented in FIG. 18 and the processing executed in step S307 added between step S305 and step S350.

As shown in FIG. 20, in step S302, the controller 300 reads information indicating the pedal operation quantity S at the accelerator pedal 152 detected by the accelerator operation quantity detector 152$a$ and information indicating the input rotation speed Nci and the output rotation speed Nco respectively detected by the rotation speed detectors 14 and 15. In step S302, the controller 300 also reads information indicating the cooling oil temperatures Tbf and Tbr detected via the oil temperature sensors 163$a$ and 163$b$ respectively, calculates the cooling oil temperature Tb represented by their average and stores the cooling oil temperature Tb thus calculated into a storage device. Upon completing the read of the various types of information in step S302, the operation proceeds to step S305.

Once the processing in step S305 (Nt calculation) is executed, the operation proceeds to step S307, in which the controller 300 calculates the traveling load L based upon the input rotation speed Nci and the output rotation speed Nco before the operation proceeds to step S350.

Upon executing the processing in step S350 (first speed limit value Nx1 calculation), the operation proceeds to step S370 in which the controller 300 calculates the third speed limit value Nx3 based upon the traveling load L by referencing the load reference characteristics C3 before the operation proceeds to step S381.

In step S381, the controller 300 sets either the first speed limit value Nx1 or the third speed limit value Nx3 that is lower than the other as the selected speed limit value Nc and then the operation proceeds to step S390.

In addition to advantages and operations similar to those achieved in the first embodiment, advantages and operations described in (10) and (11) below are achieved through (variation 1) of the third embodiment described above.

(10) The maximum rotation speed of the engine 190 is limited either under temperature reference control, through which the maximum rotation speed of the engine 190 is controlled so as not to exceed a limit that is set to a lower value when the temperature of the cooling oil is higher, or under load reference control, through which the maximum rotation speed of the engine 190 is controlled so as not to exceed a limit that is set to a lower value when the traveling load is higher, by switching to the control under which the maximum rotation speed of the engine 190 is limited to a lower level. Through these measures, highly precise control can be executed in correspondence to the brake cooling oil temperature and the traveling load.

Since more heat is generated during braking while the vehicle is traveling under high load conditions, compared to that generated from braking while the vehicle is traveling under low load conditions, the brake cooling oil temperature tends to rise more readily under high load. In the variation, a limit is imposed on the maximum rotation speed of the engine 190 in a high-load traveling state, in which the cooling oil temperature tends to rise more readily, even when the current cooling oil temperature is low, and as a result, an increase in the cooling oil temperature can be effectively suppressed.

(11) A work vehicle such as a wheel loader typically operates with a great deal of stop/start running. This variation achieves an added advantage of reducing the frequency of braking operation performed by the operator under high traveling load conditions, such as when the vehicle is started or stopped, by limiting the maximum rotation speed of the engine 190 and thus restricting acceleration. As a result, an increase in the cooling oil temperature can be even more effectively suppressed.

—(Variation 2) of Third Embodiment—

In reference to FIG. 2, FIG. 16, and FIG. 21, the prime mover control device achieved in variation 2 of the third embodiment will be described. The work vehicle in (variation 2) of the third embodiment assumes a structure similar to that of the work vehicle achieved in the third embodiment (see FIG. 2 and FIG. 16). The following explanation will focus on features different from those of the third embodiment.

In the third embodiment, either the first speed limit value Nx1 calculated based upon the temperature reference characteristics C1 or the second speed limit value Nx2 calculated based upon the vehicle speed reference characteristics C2 that is lower than the other is set as the selected limit value Nc.

(Variation 2) of the third embodiment is distinct in that the selection unit 300$k$ selects the lowest value among the first speed limit value Nx1 and the second speed limit value Nx2 respectively calculated based upon the temperature reference characteristics C1 and the vehicle speed reference characteristics C2 described in reference to the third embodiment and the third speed limit value Nx3 calculated based upon the load reference characteristics C3 described in reference to (variation 1) of the third embodiment and sets the selected limit value as a selected limit value Nc.

FIG. 21 is a flowchart of the operation of the limit control processing executed to limit the maximum engine rotation speed by the controller in the wheel loader achieved in (variation 2) of the third embodiment of the present invention. The flowchart presented in FIG. 21 includes the processing executed in steps S303 and S382 replacing steps S302 and S381 in the flowchart presented in FIG. 20 and the processing executed in step S360 as described in reference to the third embodiment, added between step S350 and step S370.

As shown in FIG. 21, in step S303, the controller 300 reads information indicating the pedal operation quantity S at the accelerator pedal 152 detected by the accelerator operation quantity detector 152a, information indicating the vehicle speed V detected by the vehicle speed sensor 16 and information indicating the input rotation speed Nci and the output rotation speed Nco respectively detected by the rotation speed detectors 14 and 15. In step S303, the controller 300 also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S303, the operation proceeds to step S305.

Once the processing in step S307 (L calculation) is executed as has been described in reference to (variation 1) of the third embodiment, the operation proceeds to step S350. The controller 300 executes the processing in step S350 (first speed limit value Nx1 calculation) as has been described in reference to the third embodiment, the processing in step S360 (second speed limit value Nx2 calculation) as has been described in reference to the third embodiment and the processing in step S370 (third speed limit value Nx3 calculation) as has been described in reference to (variation 1) of the third embodiment, and then the operation proceeds to step S382.

In step S382, the controller 300 sets the lowest value among the first speed limit value Nx1, the second speed limit value Nx2 and the third speed limit value Nx3 as the selected limit value Nc, before the operation proceeds to step S390.

Advantages and operations similar to those achieved in the third embodiment and (variation 1) of the third embodiment are achieved through (variation 2) of the third embodiment described above.

The following variations are also within the scope of the present invention and one of the variations or a plurality of the variations among the variations may be adopted in combination with any of the embodiments described earlier.

(Variation 1)

The prime mover control device may be configured so as not to limit the maximum rotation speed of the engine 190 even if the cooling oil temperature is higher than a predetermined temperature as long as the speed stage setting is lower than a predetermined speed stage. FIG. 22 is a flowchart of the operation of the limit control processing executed to limit the maximum engine rotation speed by the controller in the wheel loader achieved in this variation of the present invention. The flowchart presented in FIG. 22 includes the processing executed in step S400 replacing step S200 in the flowchart presented in FIG. 11, in reference to which the second embodiment has been described, and the processing executed in step S445 added between step S205 and step S250.

As shown in FIG. 22, in step S400, the controller reads information indicating the pedal operation quantity S at the accelerator pedal 152 detected by the accelerator operation quantity detector 152a and information indicating the speed stage setting. In step S400, the controller also reads information indicating the cooling oil temperatures Tbf and Tbr detected via the oil temperature sensors 163a and 163b respectively, calculates the cooling oil temperature Tb represented by their average and stores the cooling oil temperature Tb thus calculated into a storage device. Upon completing the read of the various types of information in step S400, the operation proceeds to step S205.

In step S445, the controller makes a decision as to whether or not the speed stage setting is equal to or higher than the third speed stage. If an affirmative decision is made in step S445, the limit mode is selected (not shown) and the operation proceeds to step S250, whereas if a negative decision is made in step S445, the non-limit mode is selected (not shown) and the operation then proceeds to step S298.

When the speed stage setting is low (the first speed or the second speed), the vehicle speed is relatively low and engine braking is relatively effective. The frequency with which the operator steps on the brake pedal 31 is thus bound to be reduced under such circumstances. In this variation, no limit is imposed on the maximum rotation speed of the engine 190 even if the cooling oil temperature is higher than a predetermined temperature, as long as the speed stage setting detected by the controller is lower than a predetermined speed stage and, as a result, better work efficiency can be achieved.

It is to be noted that while this variation has been described as a variation of the second embodiment shown in FIG. 11, the present invention is not limited to this example. Namely, the limit on the maximum rotation speed of the engine 190 may be suspended, as long as the speed stage setting is low in the first embodiment, any of the variations of the first embodiment, any of the variations of the second embodiment, the third embodiment or any of the variations of the third embodiment, as well.

(Variation 2)

While the target engine rotation speed Nt is limited so as not to exceed a fixed value, i.e., the limit value Nxc, once the limit mode is set in the first embodiment and (variation 1) through (variation 3) of the first embodiment, the present invention is not limited to this example. Once the limit mode is selected, the limit value may be calculated based upon any of the temperature reference characteristics C1, the vehicle speed reference characteristics C2 and the load reference characteristics C3 having been described in reference to the second and third embodiments and the variations thereof.

(Variation 3)

While the present invention is adopted in a wheel loader commonly referred to as a TC-drive wheel loader in the embodiments described above, the present invention is not limited to this example. For instance, the present invention may be adopted in a wheel loader commonly referred to as an HST-drive wheel loader instead. In such a case, the output pressure at an HST pump may be detected as the traveling load.

(Variation 4)

While the engine 190 is utilized as the prime mover for generating a traveling drive force in the embodiments described above, the present invention is not limited to this example. For instance, an electric traveling motor may be used as the prime mover and the traveling drive force may be generated via the electric traveling motor.

(Variation 5)

While the differential housing body 171 and the corresponding brake cases 172 form an integrated case in the embodiments described above, the present invention is not limited to this example. Namely, the present invention may be adopted in a work vehicle equipped with any of various types of brake devices, each having a brake housed inside a case with cooling oil used to cool the brake also contained within the case.

(Variation 6)

While the present invention is adopted in a wheel loader in the embodiments described above, the present invention may be adopted in other industrial vehicles such as a wheel excavator and a forklift.

As long as features characterizing the present invention remain intact, the present invention is in no way limited to the particulars of the embodiments described above and any other modes conceivable within the scope of the technical teachings of the present invention will be considered within the scope of the present invention.

The disclosure of the following priority application is herein incorporated by reference:

Japanese Patent Application No. 2014-15387 filed Jan. 30, 2014

REFERENCE SIGNS LIST

2 TC, 3 transmission, 4 drive shaft, 5 axle, 13 rotation speed sensor, 14 rotation speed detector, 15 rotation speed detector, 16 vehicle speed sensor, 17 forward/reverse switching lever, 18 shift switch, 20 transmission control unit, 30 hydraulic source, 31 brake pedal, 32 brake valve, C1 temperature reference characteristics, C2 vehicle speed reference characteristics, C3 load reference characteristics, 100 controller, 100a speed ratio calculation unit, 100b traveling load calculation unit, 100c target speed setting unit, 100d mode determination unit, 100e mode setting unit, 100f correction unit, 101 center pin, 110 front body, 111 arm, 112 bucket, 113 tire, 115 bucket cylinder, 116 steering cylinder 117 arm cylinder, 120 rear body, 121 operator's cab, 122 machine room, 152 accelerator pedal, 152a accelerator operation quantity detector, 163a oil temperature sensor, 170 differential device, 171 differential housing body, 172 brake case, 190 engine, 190a engine controller, 200 controller, 200f correction unit, 200h mode control unit, 300 controller, 300k selection unit, 300r limit value calculation unit

The invention claimed is:

1. A prime mover control device for a work vehicle, comprising:
a controller that controls a rotation speed of a prime mover in correspondence to an operation quantity at an accelerator operation member;
an oil temperature sensor that detects a temperature of cooling oil used to cool a brake; and
a vehicle speed sensor that detects a vehicle speed;
wherein the controller is programmed to limit a maximum rotation speed of the prime mover when the temperature of the cooling oil detected by the oil temperature sensor is higher than a predetermined temperature, compared to when the temperature of the cooling oil detected by the oil temperature sensor is lower than the predetermined temperature, and
wherein the controller is programmed not to limit the maximum rotation speed of the prime mover even when the temperature of the cooling oil detected by the oil temperature sensor is higher than the predetermined temperature if the vehicle speed detected by the vehicle speed sensor is lower than a predetermined vehicle speed.

2. The prime mover control device for a work vehicle according to claim 1, wherein the controller is further programmed to limit the maximum rotation speed of the prime mover to a limit value which is set in advance to be lower than an upper limit value of the rotation speed of the prime mover and to be higher than a rotation speed which corresponds to a maximum torque point of the prime mover.

3. A prime mover control device for a work vehicle, comprising:
a controller that controls a rotation speed of a prime mover in correspondence to an operation quantity at an accelerator operation member;
an oil temperature sensor that detects a temperature of cooling oil used to cool a brake; and
a load calculation unit that calculates a traveling load based on a rotation speed at an input shaft of a torque converter and a rotation speed at an output shaft of the torque converter;
wherein the controller is programmed to limit a maximum rotation speed of the prime mover when the temperature of the cooling oil detected by the oil temperature sensor is higher than a predetermined temperature, compared to when the temperature of the cooling oil detected by the oil temperature sensor is lower than the predetermined temperature, and
wherein the controller is programmed not to limit the maximum rotation speed of the prime mover even when the temperature of the cooling oil detected by the oil temperature sensor is higher than the predetermined temperature if the traveling load detected by the load calculation unit is lower than a predetermined load.

4. The prime mover control device for a work vehicle according to claim 3, wherein the controller is further programmed to limit the maximum rotation speed of the prime mover to a limit value which is set in advance to be lower than an upper limit value of the rotation speed of the prime mover and to be higher than a rotation speed which corresponds to a maximum torque point of the prime mover.

5. A prime mover control device for a work vehicle, comprising:
a controller that controls a rotation speed of a prime mover in correspondence to an operation quantity at an accelerator operation member; and
an oil temperature sensor that detects a temperature of cooling oil used to cool a brake;
wherein the controller includes a speed stage detection unit that detects a speed stage setting at a transmission,
wherein the controller is programmed to limit a maximum rotation speed of the prime mover when the temperature of the cooling oil detected by the oil temperature sensor is higher than a predetermined temperature, compared to when the temperature of the cooling oil detected by the oil temperature sensor is lower than the predetermined temperature, and
wherein the controller is programmed not to limit the maximum rotation speed of the prime mover even when the temperature of the cooling oil detected by the oil temperature sensor is higher than the predetermined temperature if the speed stage setting detected by the speed stage detection unit is lower than a predetermined speed stage.

6. The prime mover control device for a work vehicle according to claim 5, wherein the controller is further programmed to limit maximum rotation speed of the prime mover to a limit value which is set in advance to be lower than an upper limit value of the rotation speed of the prime mover and to be higher than a rotation speed which corresponds to a maximum torque point of the prime mover.

* * * * *